(12) United States Patent
Kanai et al.

(10) Patent No.: US 8,877,310 B2
(45) Date of Patent: *Nov. 4, 2014

(54) PROPYLENE RESIN MULTI-LAYER SHEET, AND PACKAGING BODY FOR HEAT TREATMENT USING SAME

(75) Inventors: Gen Kanai, Mie (JP); Yuji Kadowaki, Mie (JP)

(73) Assignee: Japan Polypropylene Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/822,404

(22) PCT Filed: Sep. 8, 2011

(86) PCT No.: PCT/JP2011/070459
§ 371 (c)(1),
(2), (4) Date: Mar. 12, 2013

(87) PCT Pub. No.: WO2012/036063
PCT Pub. Date: Mar. 22, 2012

(65) Prior Publication Data
US 2013/0171389 A1    Jul. 4, 2013

(30) Foreign Application Priority Data
Sep. 14, 2010   (JP) .................. 2010-205708

(51) Int. Cl.
| | |
|---|---|
| B29D 22/00 | (2006.01) |
| C08L 23/14 | (2006.01) |
| B65D 33/00 | (2006.01) |
| B32B 27/32 | (2006.01) |
| C08L 23/08 | (2006.01) |
| C08L 23/10 | (2006.01) |

(52) U.S. Cl.
CPC ............ *C08L 23/14* (2013.01); *C08L 23/0815* (2013.01); *B65D 33/00* (2013.01); *B32B 2250/242* (2013.01); *B32B 27/32* (2013.01); *B32B 2439/46* (2013.01); *C08L 23/10* (2013.01); *C08L 2205/02* (2013.01); *C08L 2314/02* (2013.01); *C08L 23/142* (2013.01); *C08L 2205/025* (2013.01); *B32B 2439/80* (2013.01)
USPC ....... 428/36.91; 383/109; 428/35.7; 428/35.2

(58) Field of Classification Search
CPC . C08L 23/10; C08L 2205/02; C08L 23/0815; C08L 23/14; C08L 23/142; C08L 2205/025; C08L 2314/02; B32B 27/32; B32B 2250/02; B32B 2250/03; B32B 2439/80; B65D 33/00

USPC .................... 428/35.7, 35.2, 36.91; 525/240; 383/109
See application file for complete search history.

(56) References Cited

U.S. PATENT DOCUMENTS

| | | | |
|---|---|---|---|
| 6,875,485 B2 * | 4/2005 | Kanai et al. .................. | 428/34.1 |
| 7,662,888 B2 * | 2/2010 | Kanai et al. .................. | 525/271 |
| 2011/0311742 A1 * | 12/2011 | Kadowaki et al. ........... | 428/35.2 |
| 2013/0074454 A1 * | 3/2013 | Babrowicz ...................... | 53/467 |
| 2013/0171389 A1 * | 7/2013 | Kanai et al. .................. | 428/35.7 |
| 2013/0177721 A1 * | 7/2013 | Kadowaki et al. ........... | 428/35.2 |

FOREIGN PATENT DOCUMENTS

| | | |
|---|---|---|
| JP | 7 125158 | 5/1995 |
| JP | 9 75444 | 3/1997 |
| JP | 9 99036 | 4/1997 |
| JP | 9 308682 | 12/1997 |
| JP | 9 324022 | 12/1997 |
| JP | 2005 111874 | 4/2005 |
| JP | 2006 307072 | 11/2006 |
| JP | 2006 307120 | 11/2006 |
| JP | 2007 245490 | 9/2007 |
| JP | 2008 524391 | 7/2008 |
| JP | 2008 279600 | 11/2008 |
| JP | 2009 154332 | 7/2009 |
| JP | 2011 68116 | 4/2011 |

OTHER PUBLICATIONS

PCT/JP2011/0711066 Apr. 16, 2013.*
U.S. Appl. No. 13/822,689, filed Mar. 13, 2013, Kadowaki, et al.
International Search Report Issued Nov. 29, 2011 in PCT/JP11/70459 Filed Sep. 8, 2011.

* cited by examiner

*Primary Examiner* — N. Edwards
(74) *Attorney, Agent, or Firm* — Oblon, Spivak, McClelland, Maier & Neustadt, L.L.P.

(57) ABSTRACT

The invention discloses a multilayer propylene resin sheet and a heat-treatable packaging material which have an excellent transparency, flexibility and very-low-temperature impact resistance, and which reduce the thickness variation during lamination, suppress appearance defects such as interfacial roughness and mitigate thinning during fabrication. The multilayer propylene resin sheet is composed of at least two layers, which are (1) an inner layer and (2) an outer layer. The inner layer (1) is made of a resin composition containing 40 to 89 wt % of a specific propylene resin composition (A), 10 to 40 wt % of a specific ethylene-α-olefin copolymer (B), and 1 to 20 wt % of a specific propylene resin (C). The outer layer (2) is made of a specific propylene resin composition.

12 Claims, No Drawings

PROPYLENE RESIN MULTI-LAYER SHEET, AND PACKAGING BODY FOR HEAT TREATMENT USING SAME

TECHNICAL FIELD

The present invention relates to a multilayer propylene resin sheet and to a heat-treatable packaging material which uses the same. More specifically, the present invention relates both to a multilayer propylene resin sheet which, even when subjected to heat treatment under applied pressure such as pressurized steam treatment or pressurized hot-water treatment, has an excellent heat resistant and thus does not readily incur deformation, yet is endowed with a good transparency and flexibility, and also has an excellent impact resistance, particularly at very low temperatures (e.g., −25° C.); and also to a heat-treatable packaging material which uses the same.

BACKGROUND ART

The performance characteristics desired in packaging materials for pascalization and in packaging bags that must be disinfected or sterilized under pressurized treatment, such as IV infusion bags for medications and the like, include transparency to allow the contents to be checked, flexibility to enable liquid discharge without forming an air vent, low-temperature impact resistance so that the bag does not rupture even with rough handling during transport in very cold regions (e.g., in a −25° C. environment), heat resistance so that deformation and fusion do not occur even when disinfection or sterilization at 121° C. is carried out, and fabricability such as heat-sealability to facilitate bag-making.

With regard to IV bags in particular, vinyl chloride resins were formerly used as a material that satisfies the above performance characteristics. However, owing to the bleeding out of plasticizers and waste disposal problems, and also to recent concerns over the global environment, such resins have been replaced with polyolefin resins.

IV bags composed primarily of polyethylene, though endowed with an excellent flexibility and impact resistance, have a poor heat resistance and thus give rise to appearance defects such as deformation at a sterilization temperature of 121° C. (overkill conditions), making them incapable of functioning satisfactorily as IV bags (see, for example, Patent Document 1). On the other hand, IV bags composed primarily of polypropylene have a good heat resistance, but are hard as an IV bag material and have an inadequate impact resistance at low temperatures, as a result of which these too are unable to satisfy the above performance characteristics (see, for example, Patent Document 2).

Hence, art has been disclosed in which flexibility and impact resistance are conferred by the addition of an elastomeric component to polypropylene (see, for example, Patent Document 3). However, problems with this approach are that the heat resistance of polypropylene is sacrificed, low-molecular-weight ingredients bleed out following sterilization, and the transparency worsens. Art involving the addition of a styrene-based elastomer as the elastomeric component has also been disclosed (see, for example, Patent Document 4), but blocking tends to arise and the productivity leaves much to be desired. Moreover, styrene-based elastomers are more expensive than olefinic elastomers, leading to cost-related issues as well.

Unrelated to the above, polypropylene block copolymers in which an elastomeric component is added by continuous polymerization using a Ziegler-Natta catalyst have been developed (see, for example, Patent Document 5). Unsurprisingly, however, bleedout arises following sterilization, and the transparency is poor. Water-cooled blown film extruded films composed of a propylene-ethylene block copolymer having an elastomeric component added thereto and obtained by continuous polymerization using a metallocene catalyst have also been disclosed. These films exhibit reduced bleedout under 40° C. conditions (see, for example, Patent Document 6), but do not yet have a sufficient low-temperature impact resistance. In addition, films for medical use which contain a heterogeneous blend of resins have been disclosed (see, for example, Patent Document 7), but these too lack an adequate impact resistance at low temperature.

Thus, although there exists a need for low-cost IV bag materials which strike a good balance among the properties of heat resistance, transparency, flexibility and impact resistance, materials satisfying such a need have not previously been found.

Moreover, the IV bag-making process includes the steps of welding injection-molded parts such as a spout, a discharge port and an injection port to the bag, which requires melting of the film to allow sufficient fusion to take place. For this purpose, heat sealing is carried out under very harsh conditions (e.g., high temperature, high pressure, long duration). In a fully melted state, the molten resin ends up sticking to the sealing bar, inevitably worsening productivity. To address this problem, technology has been disclosed wherein the outer layer and the inner layer of a laminated film are provided with different melting points, enabling the inner layer to be melted while the outer layer remains solid (see, for example, Patent Document 7). The inner layer is made of a polyethylene resin and can thus withstand a sterilization temperature of 115° C.; however, with 121° C. sterilization, the inner faces of the film end up fusing to each other ("internal fusion"). Hence, the heat resistance is inadequate.

CITATION LIST

Patent Literature

Patent Document 1: Japanese Patent Application Laid-open No. H9-308682

Patent Document 2: Japanese Patent Application Laid-open No. H9-99036

Patent Document 3: Japanese Patent Application Laid-open No. H9-75444

Patent Document 4: Japanese Patent Application Laid-open No. H9-324022

Patent Document 5: Japanese Patent Application Laid-open No. 2006-307072

Patent Document 6: Japanese Translation of PCT Application No. 2008-524391

Patent Document 7: Japanese Patent Application Laid-open No. 2007-245490

SUMMARY OF INVENTION

Technical Problem

To provide a good balance of the performance characteristics such as transparency, heat resistance and flexibility required of heat-treatable packaging bags, it is effective to use a combination of a propylene-α-olefin random copolymer which exhibits heat resistance with a propylene-α-olefin random copolymer to which has been added a specific amount of α-olefin that is capable of increasing flexibility without a loss of transparency. However, in this state, the packaging material is unable to withstand harsh heat-sealing conditions and the thickness of the heat-sealed areas decreases (thinning). As a result, if a heat-treatable packaging material in the form of a bag that has been filled should be dropped, there is a possibility that cracking will arise from the heat-sealed edges, causing the bag to burst.

Accordingly, the present invention provides both a multilayer sheet which has an excellent flexibility, transparency and heat resistance, can withstand harsh heat-sealing conditions during bag-making, and has an excellent impact resistance, particularly at very low temperatures (e.g., −25° C.); and also provides a heat-treatable packaging material which uses the same.

Solution to Problem

The inventors have conducted various investigations and analyses with the aim of arriving at a solution to the above problems. As a result, they have discovered that these problems can be satisfactorily resolved by including in an outer layer a propylene resin having a specific melting peak temperature, and by blending in an inner layer specific amounts of a mixture of specific propylene-α-olefin copolymers, an ethylene-α-olefin copolymer component having a specific density and melt flow rate, and a propylene resin having a specific melting peak temperature and a specific melt flow rate. The inventors ultimately arrived at the present invention upon learning that the above resin formulations and layer structure enable a multilayer sheet which resolves the above challenges to be obtained.

That is, in a first aspect, the invention provides a multilayer propylene resin sheet of at least two layers having an inner layer and an outer layer, wherein
(1) the inner layer is made of a propylene resin composition (X) containing:
40 to 89 wt % of a propylene resin composition (A) which satisfies the conditions of
(A-i) having from 30 to 70 wt % of a propylene-α-olefin random copolymer component (A1) having a melting peak temperature (Tm (A1)) of from 120 to 150° C., and from 70 to 30 wt % of a propylene-α-olefin random copolymer component (A2) having a $C_2$ and/or $C_{4-8}$ α-olefin content (α [A2]) of more than 10 wt % and up to 30 wt %, and
(A-ii) having a melt flow rate (MFR (A), at 230° C. and 2.16 kg) in the range of from 0.5 to 20 g/10 min,
10 to 40 wt % of an ethylene-α-olefin copolymer (B) which satisfies the conditions of
(B-i) having a density in the range of from 0.860 to 0.910 $g/cm^3$, and
(B-ii) having a melt flow rate (MFR (B), at 190° C. and 2.16 kg) of from 0.1 to 20 g/10 min, and
1 to 20 wt % of a propylene resin (C) which satisfies the conditions of
(C-i) having a melting peak temperature (Tm (C)) of more than 150° C. and up to 170° C., and
(C-ii) having a melt flow rate (MFR(C), at 230° C. and 2.16 kg) in the range of from 0.5 to 30 g/10 min; and
(2) the outer layer is made of a propylene resin composition (Y) containing a propylene resin (D) having a melting peak temperature (Tm (D)) in the range of from 150 to 170° C.

In a second aspect, the invention provides the multilayer propylene resin sheet according to the first aspect of the invention, wherein the propylene resin composition (A) is obtained using a Ziegler-Natta catalyst.

In a third aspect, the invention provides the multilayer propylene resin sheet according to the first or second aspect of the invention, wherein the propylene-α-olefin random copolymer component (A1) and the propylene-α-olefin random copolymer component (A2) of the propylene resin composition A are obtained by successive polymerization including, in order:
a first step of polymerizing from 30 to 70 wt % of the propylene-α-olefin random copolymer component (A1), and
a second step of polymerizing from 70 to 30 wt % of the propylene-α-olefin random copolymer component (A2) having an α-olefin content (α [A2]) of more than 10 wt % and up to 30 wt %.

In a fourth aspect, the invention provides the multilayer propylene resin sheet according to the first or second aspect of the invention, wherein the propylene-α-olefin random copolymer component (A1) and the propylene-α-olefin random copolymer component (A2) of the propylene resin composition A are obtained by successive polymerization including, in order:
a first step of polymerizing from 30 to 70 wt % of the propylene-α-olefin random copolymer component (A1), and
a second step of polymerizing from 70 to 30 wt % of the propylene-α-olefin random copolymer component (A2) having an α-olefin content (α [A2]) of more than 14 wt % and up to 30 wt %.

In a fifth aspect, the invention provides the multilayer polypropylene resin sheet according to any one of the first to fourth aspects of the invention which further includes an innermost layer, with the multilayer polypropylene resin sheet being formed of at least three layers in the order: outer layer, inner layer, innermost layer.

In a sixth aspect, the invention provides the multilayer polypropylene resin sheet according to any one of the first to fifth aspects of the invention, wherein the propylene-α-olefin random copolymer (A2) in the propylene resin composition (A) is a propylene-ethylene random copolymer.

In a seventh aspect, the invention provides the multilayer polypropylene resin sheet according to any one of the first to sixth aspects of the invention, wherein the propylene-α-olefin random copolymer (A1) in the propylene resin composition (A) is a propylene-ethylene random copolymer.

In an eighth aspect, the invention provides a heat-treatable packaging material which uses the multilayer propylene resin sheet according to any one of the first to seventh aspects of the invention.

In a ninth aspect, the invention provides the heat-treatable packaging material according to the eight aspect of the invention which is an IV infusion bag.

Advantageous Effects of Invention

A basic feature of both the inventive multilayer sheet and the inventive heat-treatable packaging material using the same is the use in an inner layer (1) of a propylene resin composition (X) containing a specific propylene resin composition (A), a specific ethylene-α-olefin copolymer (B) and a propylene resin (C) having a specific melting peak temperature, and the use in an outer layer (2) of a propylene resin composition (Y) composed primarily of a specific propylene resin (D).

Because the propylene resin composition (A) used in the inner layer (1) contains a propylene-α-olefin random copolymer component (A1) having a melting peak temperature in a specific range and a propylene-α-olefin random copolymer component (A2) having a specific α-olefin content, it has a high heat resistance, transparency and flexibility, an excellent low-temperature impact resistance, and is able to confer the resulting multilayer sheet with a good balance of flexibility and low-temperature impact resistance.

The ethylene-α-olefin copolymer (B) used in the inner layer (1) is characterized in terms of its density and melt flow rate, and is capable of conferring to the resulting multilayer sheet the quality of being flexible without a loss of transparency and low-temperature impact resistance.

In addition, the propylene resin (C) used in the inner layer (1) is characterized by the melting peak temperature and melt flow rate, and is able to render the resulting multilayer sheet highly suitable for bag-making by suppressing thinning of the sheet during fabrication.

In the practice of the invention, although the above components are included in the inner layer (1), it is not always necessary to have the propylene-α-olefin random copolymer component (A1) exhibiting a melting peak temperature in a specific range and the propylene-α-olefin random copolymer component (A2) having a specific α-olefin content form the single composition referred to herein as propylene resin composition (A). For example, it is possible for production to include a first step of polymerizing the propylene resin (C) by a continuous polymerization process, then a step of polymerizing the propylene-α-olefin random copolymer component (A2) having a specific α-olefin content; and subsequently mixing into the resulting resin the separate propylene-α-olefin random copolymer component (A1) having a melting peak temperature in a specific range. Such a case also falls within the scope of the present invention.

A propylene resin (D) characterized in terms of the melting peak temperature is used in propylene resin composition (Y) employed in the outer layer (2) to prevent the multilayer sheet from sticking to the sealing bar during heat sealing, and thereby make the multilayer sheet suitable for bag-making.

Therefore, the multilayer propylene resin sheet and the heat-treatable packaging material obtained using such a multilayer sheet of the invention have an excellent transparency, flexibility and very-low-temperature impact resistance, reduce the thickness variation during lamination, suppress appearance defects such as interfacial roughness, and mitigate the reduction in thickness (thinning of the sheet) during fabrication. This combination of properties make them highly suitable for use as packaging materials for pascalization and as IV infusion bags.

DESCRIPTION OF EMBODIMENTS

The multilayer propylene resin sheet of the invention is composed of at least two layers: an inner layer (1) in which a propylene resin composition (X) is used, and an outer layer (2) in which a propylene resin composition (Y) is used. The invention also provides a heat-treatable packaging material obtained using such a multilayer sheet.

The components making up the respective layers of the multilayer propylene resin sheet of the invention, the production of the components in each layer, and the heat-treatable packaging material are described below in detail.

[I] Components Making Up the Respective Layers of the Multilayer Propylene Resin Sheet 1. Inner Layer (1)

The inner layer (1) is formed of a propylene resin composition (X) which includes both a propylene resin composition composed of a component (A1), a component (A2) and a component (C), and also includes an ethylene-α-olefin copolymer (B). In a preferred embodiment, the inner layer (1) is formed of a propylene resin composition (X) which includes a propylene resin composition (A) composed of components (A1) and (A2) described below, an ethylene-α-olefin copolymer (B), and a propylene resin (C).

(1) Propylene Resin Composition (A)

(1-1) Properties of Propylene Resin Composition (A)

The propylene resin composition (A) (also referred to below as "component (A)") which is used as a component of propylene resin composition (X) making up the inner layer (1) of the multilayer propylene resin sheet of the invention is required to have a high transparency, flexibility and impact resistance. To fulfill these requirements at a high level, component (A) must satisfy conditions (A-i) and (A-ii) below.

(A-i) Includes from 30 to 70 wt % of a propylene-α-olefin random copolymer component (A1) having a melting peak temperature (Tm (A1)) of from 120 to 150° C., and from 70 to 30 wt % of a propylene-ethylene random copolymer component (A2) having α-olefin content (α [A2]) of more than 10 wt % and up to 30 wt %.

(A-ii) Has a melt flow rate (MFR (A), at 230° C. and 2.16 kg) in the range of from 0.5 to 20 g/10 min.

The above conditions are described in detail in (i) to (v) below.

(i) Melting Peak Temperature (Tm (A1)) of Propylene-α-Olefin Random Copolymer Component (A1)

Component (A1) is a component which determines crystallinity in the propylene resin composition (component (A)). To improve the heat resistance of component (A), it is necessary for the melting peak temperature Tm (A1) (also referred to below as "Tm (A1)") of component (A1) to be high. However, if Tm (A1) is too high, this hinders the flexibility and transparency. On the other hand, if Tm (A1) is too low, the heat resistance worsens, as a result of which thinning of the sheet may proceed during heat sealing. Tm (A1) must be in the range of from 120 to 150° C., and is preferably from 125 to 150° C., and more preferably from 130 to 145° C. At less than 120° C., the heat resistance is inadequate, making it difficult to maintain the shape of the multilayer sheet during heat treatment. At more than 150° C., the flexibility decreases.

Here, the melting peak temperature Tm is a value determined with a differential scanning calorimeter (DSC, available from Seiko Instruments, Inc.). Specifically, it is the value determined as the melting peak temperature when a 5.0 mg sample that has been collected and held at 200° C. for 5 minutes is subsequently crystallized by lowering the temperature to 40° C. at a ramp-down rate of 10° C./min, then melted at a ramp-up rate of 10° C./min.

(ii) Ratio of Component (A1) in Component (A)

Although component (A1) confers heat resistance to component (A), if the ratio W(A1) of component (A1) in component (A) is too high, a sufficient flexibility, impact resistance and transparency cannot be exhibited. Hence, it is essential for the ratio of component (A1) to be 70 wt % or less. At more than 70 wt %, the flexibility and low-temperature impact resistance worsen.

On the other hand, when the ratio of component (A1) is too low, even if Tm (A1) is sufficient, the heat resistance is inadequate, as a result of which deformation may occur in a disinfection or sterilization step. Hence, the ratio of component (A1) must be at least 30 wt %. The preferred range in W(A1) is from 35 to 65 wt %.

(iii) α-Olefin Content α [A2] in Propylene-α-Olefin Random Copolymer Component (A2)

Component (A2) is a required component for increasing the flexibility, impact resistance and transparency of component (A), and it is critical for α [A2] to be greater than 10 wt %. If α [A2] is 10 wt % or less, the low-temperature impact resistance worsens. On the other hand, if α [A2] is increased too much in order to lower the crystallinity of component (A2), the transparency and flexibility worsen.

Hence, the component (A2) content α [A2] in the component (A) used in the present invention must be more than 10 wt % and up to 30 wt %, is preferably more than 14 wt % and up to 25 wt %, and is more preferably more than 17 wt % and up to 25 wt %.

(iv) Ratio of Component (A2) in Component (A)

If the ratio W(A2) of component (A2) in component (A) is too high, the heat resistance is inadequate. Hence, it is critical for W(A2) to be held to not more than 70 wt %. On the other hand, if W(A2) is too low, the flexibility and low-temperature impact resistance worsen. Hence, it is critical for W(A2) to be at least 30 wt %. The preferred range for W(A2) is from 35 to 65 wt %.

(v) Method of Preparing Component (A)

Component (A) may be a blend of the propylene-α-olefin copolymer (A1) which satisfies the above melting peak temperature Tm (A1) and the propylene-α-olefin random copolymer (A2) which satisfies the α-olefin content α [A2], and may be prepared by the following successive polymerization.

A preferred method for preparing component (A) by successive polymerization is a method wherein a Ziegler-Natta catalyst is used to successively polymerize, in a first step, from 30 to 70 wt % of a propylene-α-olefin random copolymer component (A1) having a melting peak temperature Tm (A1) in the range of 120 to 150° C. and, in a second step, from 70 to 30 wt % of a propylene-α-olefin random copolymer component (A2) having a α-olefin content α [A2] of more than 10 wt % and up to 30 wt %.

The method of successive polymerization, although not particularly limited to, may be suitably selected from among known polymerization methods and polymerization conditions. Illustrative examples include the following methods.

A catalyst having a high stereoregularity is generally used as the polymerization catalyst. Examples include catalysts which are a combination of a titanium trichloride composition, an organoaluminum compound and an aromatic carboxylic acid ester, and have been obtained by reducing titanium tetrachloride with an organoaluminum compound, followed by treatment with various kinds of electron donors and electron acceptors (see Japanese Patent Application Laid-open Nos. S56-100806, S56-120712 and S58-104907); and supported catalysts obtained by bringing titanium tetrachloride and various types of electron donors into contact with a magnesium halide (see Japanese Patent Application Laid-open Nos. S57-63310, S63-43915 and S63-83116).

Multistage polymerization by a slurry process or a vapor phase fluidized bed process in the presence of such a catalyst is preferred. For example, component (A) may be obtained by random copolymerizing propylene and α-olefin in Step (1) described below, and subsequently random copolymerizing propylene and α-olefin in Step (2).

Step (1): Propylene and an α-olefin are polymerized in the presence of hydrogen as a molecular weight adjusting agent. The polymerization temperature is generally selected from the range of 40 to 90° C., and the pressure is generally selected from the range of $2\times10^5$ to $35\times10^5$ Pa.

Step (2): Propylene and an α-olefin are polymerized in a hydrogen atmosphere or in a state where substantially no hydrogen is present. Polymerization is carried out without interruption in the presence of the polymer formed in Step (1) and a catalyst. The polymerization temperature is generally selected from the range of 40 to 90° C., and the pressure is generally selected from the range of $2\times10^5$ to $35\times10^5$ Pa. The amount of polymer obtained in this step (2) is generally adjusted so as to be from 70 to 30 wt % of the total amount of polymer.

Step (1) and Step (2) may be employed in any combination provided the melt flow rate (MFR (A), at 230° C. and 2.16 kg) of the overall polymer obtained as a result is adjusted in the range of 0.5 to 20 g/10 min.

The α-olefin used as the comonomer in component (A1) and component (A2) is preferably selected from among $C_{2\text{-}20}$ α-olefins, examples of which include α-olefins other than propylene, such as ethylene, 1-butene, 1-pentene, 1-hexene, 3-methyl-1-butene and 4-methyl-1-pentene; and vinyl compounds such as styrene, vinylcyclopentene, vinylcyclohexane and vinylnorbornane. Two or more such comonomers may be copolymerized. The comonomer is preferably ethylene and/or 1-butene, and most preferably ethylene.

(A-ii) Melt Flow Rate of Component (A) (MFR (A))

The melt flow rate MFR (at 230° C. and 2.16 kg) of component (A) (which melt flow rate is also referred to below as "MFR (A)") must fall within the range of from 0.5 to 20 g/10 min.

MFR (A) may be determined by the ratio of the respective MFRs for component (A1) and component (A2) (also referred to below as "MFR (A1)" and "MFR (A2)"), although in this invention, so long as MFR (A) is in the range of from 0.5 to 20 g/10 min, MFR (A1) and MFR (A2) may be any values within ranges that do not compromise the objects of the invention. However, because there is a risk of appearance defects arising in cases where the MFR difference between the two is very large, the ratio MFR (A1)/MFR (A2) of MFR (A1) to MFR (A2) is preferably from 1/5 to 5/1, more preferably from 1/3 to 3/1, and even more preferably from 1/2 to 2/1. Also, it is desirable for MFR (A1) to be in the range of 2 to 10 g/10 min.

If MFR (A) is lower than 0.5 g/10 min, a roughness of appearance arises during formation of the multilayer sheet. On the other hand, if MFR (A) exceeds 20 g/10 min, the molding stability worsens, giving rise to undesirable effects such as a fluctuation in the film thickness and thus preventing a good product from being obtained.

The MFR (A) is preferably from 2 to 10 g/10 min.

Here, MFR is a value measured in accordance with JIS K7210.

(1-2) Proportion of Component (A) in Inner Layer (1)

It is critical that the proportion of the inner layer accounted for by the propylene resin composition (component (A)) be in the range of from 40 to 89 wt %, and preferably from 50 to 80 wt %, per 100 wt % of the combined weight of components (A), (B) and (C).

If the content of component (A) is too low, a good flexibility, transparency and low-temperature impact resistance cannot be obtained. On the other hand, if the content of component (A) is too high, thinning of the sheet during fabrication such as heat sealing may become more pronounced.

(2) Ethylene-α-Olefin Copolymer (B)

(2-1) Properties of Component (B)

The ethylene-α-olefin copolymer (B) (also referred to below as "component (B)") which is used as a component of the propylene resin composition (X) making up the inner layer (1) of the multilayer propylene resin sheet of the invention is a copolymer obtained by the copolymerization of ethylene with an α-olefin having preferably from 3 to 20 carbons. Preferred examples of the α-olefin include those having from 3 to 20 carbons, such as propylene, 1-butene, 1-pentene, 1-hexene, 1-octene and 1-heptene. Component (B) is a component which acts to increase the transparency and flexibility of the propylene resin composition (X), and must satisfy conditions (B-i) and (B-ii) below.

The multilayer propylene resin sheet of the invention is required to have flexibility, transparency and low-temperature impact resistance. With regard to transparency, in cases where the refractive index of component (B) differs considerably from that of component (A), the transparency of the resulting sheet worsens. Hence, it is also important to adjust the refractive indices matchingly. Control of the refractive index by density is possible. In the invention, to obtain the required transparency, it is important for the density to be set within a specific range.

The addition of component (B) is also essential for further strengthening the low-temperature impact resistance of component (A).

(B-i) Density

Component (B) used in the invention must have a density in a range of from 0.860 to 0.910 g/cm$^3$.

If the density is too low, the refractive index difference will become large, worsening the transparency. Hence, at a density below 0.860 g/cm$^3$, the transparency required in this invention cannot be ensured.

On the other hand, if the density is too high, the low-temperature impact resistance, flexibility and transparency worsen. Hence, the density must be not more than 0.910 g/cm$^3$, and is preferably not more than 0.905 g/cm$^3$, and even more preferably not more than 0.900 g/cm$^3$.

Here, the density is a value measured in general accordance with JIS K7112.

(B-ii) Melt Flow Rate of Component (B) (MFR (B))

It is critical for the inner layer (1) in the invention to have suitable flow properties in order to ensure sheet formability.

Therefore, if the melt flow rate MFR of component (B) (at 190° C. and 2.16 kg) (also referred to below as "MFR (B)") is too low, the flow properties will be inadequate, and problems such as poor dispersion will occur, resulting in a decrease in transparency. Hence, it is critical for MFR (B) to be at least 0.1 g/10 min, preferably at least 0.5 g/10 min, and more preferably at least 1.0 g/10 min.

On the other hand, if MFR (B) is too high, sheet formation is unstable and film thickness variations arise. Hence, MFR (B) must be not more than 20 g/10 min, and is preferably not more than 10 g/10 min.

The MFR is a value measured in general accordance with JIS K7210.

(2-2) Method of Producing Component (B)

Component (B) used in this invention must be set to a low density in order to make the refractive index difference with component (A) small. Moreover, to suppress tackiness and bleedout, it is desirable for the crystallinity and molecular weight distributions to be narrow. Hence, in the production of component (B), it is desirable to use a metallocene catalyst which is capable of providing narrow crystallinity and molecular weight distributions.

The metallocene catalyst and the polymerization process using this catalyst are described below.

(i) Metallocene Catalyst

Various types of known catalysts used to polymerize ethylene-α-olefin copolymers may be employed as the metallocene catalyst. Illustrative examples include the metallocene catalysts mentioned in Japanese Patent Application Laid-open Nos. S58-19309, S59-95292, S60-35006 and H3-163088.

(ii) Polymerization Process

Illustrative examples of polymerization processes include the following carried out in the presence of such catalysts: slurry processes, vapor phase fluidized bed processes, solution processes, and high-pressure bulk polymerization processes at a pressure of at least 200 kg/cm$^2$ and a polymerization temperature of at least 100° C. An example of a preferred production method is high-pressure bulk polymerization.

The component (B) used may be suitably selected from among commercially available metallocene-based polyethylenes. Examples of commercial products include AFFINITY and ENGAGE (available under these trade names from DuPont-Dow), KERNEL (available under this trade name from Japan Polyethylene Corporation, and EXACT (available under this trade name from Exxon Mobil).

In using these polyethylenes, a grade which satisfies the density and MFR that are essential features of component (B) should be suitably selected.

(2-3) Ratio of Component (B) in Inner Layer Composition

It is essential that the ratio of component (B) in the inner layer composition be in a range of from 10 to 40 wt % per 100 wt % of components (A) to (C) combined. If the ratio of component (B) is below 10 wt %, the low-temperature impact resistance conferred will be inadequate. On the other hand, if the content of component (B) is too high, the heat resistance worsens and thickness irregularities arise in the sheet, making it impossible to obtain a sheet having a good appearance.

The preferred content of component (B) per 100 wt % of components (A) to (C) combined is from 15 to 35 wt %.

(3) Propylene Resin (C)

(3-1) Properties of Component (C)

Propylene resin (C), which is used as one component of propylene resin composition (X) in the inner layer of the invention, is employed as a component which confers sheet formability and suppresses thinning of the sheet.

Component (A), which is used as the primary component of the propylene resin composition (X) of the inner layer, is very effective for imparting a high flexibility and transparency to a laminated sheet. However, because component (A1) is a relatively low-melting component, it has less amount of high-crystallinity component, and includes problem of thinning of the sheet during the heat sealing.

When attempts are thus made to broaden the crystallinity distribution of component (A) and thereby achieve a relative increase in high-crystallinity components, the low-crystallinity components also inevitably increase. As a result, these low-crystallinity components bleed out to the surface of the laminated sheet, giving rising to stickiness and appearance defects, which makes the sheet unfit for applications requiring transparency.

By adding a specific amount of component (C) to component (A) having little high-crystallinity component, the high-crystallinity components can be increased without increasing the low-crystallinity components and the low-molecular-weight components. It is possible in this way to suppress appearance defects such as thickness variations and interfacial roughness, and to suppress thinning of the sheet during heat sealing, without giving rise to appearance defects such as bleedout.

Component (C) is a propylene resin which satisfies conditions (C-i) and (C-ii) below, such as a propylene homopolymer, a propylene-α-olefin random copolymer or a propylene-α-olefin block copolymer.

(C-i) Melting Peak Temperature Tm (C)

Component (C) is preferably a propylene resin having a melting peak temperature (Tm (C)) which is higher than the melting peak temperature (Tm (A1)) of the propylene-α-olefin random copolymer component (A1). By having the melting peak temperature be higher, the resulting multilayer sheet can be conferred with the ability to suppress thinning of the sheet during heat sealing without causing appearance defects such as bleedout.

It is critical for the melting peak temperature Tm (C) of component (C) to be in the range of more than 150° C. and up to 170° C., and preferably from 155 to 170° C. If Tm (C) is 150° C. or lower, the high crystallinity component is inadequate, the flow out of the resin cannot be controlled at low level, and thinning of the sheet during heat sealing worsens as a result. Component (C) having Tm (C) higher than 170° C. is difficult to produce industrially. Tm (C) is more preferably from 155 to 170° C., and even more preferably from 158 to 167° C.

(C-ii) Melt Flow Rate MFR(C)

Also, in order to ensure sheet formability, it is important for component (C) to have suitable flow properties. The melt flow rate MFR (at 230° C. and 2.16 kg loading) (also referred to below as "MFR(C)"), which is a measure of the flow properties, must be in a range of from 0.5 to 30 g/10 min. When MFR(C) is less than 0.5 g/10 min, dispersion worsens, which tends to give rise to the appearance defects known as gels and fisheyes. On the other hand, at more than 30 g/10 min, the film formability tends to worsen. The upper limit in MFR(C) is preferably 15 g/10 min, and more preferably 12 g/10 min. The range in MFR is most preferably from 2.5 to 12 g/10 min.

Here, MFR is a value measured in general accordance with JIS K7210.

(3-2) Method of Producing Component (C)

The propylene resin component (C) may be produced by any method, so long as the above properties are satisfied. In cases where a composition of a propylene (co)polymer component (C1) and a propylene-ethylene random copolymer (C2) is produced, the propylene resin (C) may be produced using an apparatus that mixes a propylene (co)polymer (C1) and a propylene-ethylene random copolymer (C2) which have been separately produced, or the propylene resin (C) may be consecutively produced by, in a first step, producing a propylene (co)polymer (C1) and subsequently, in a second step, producing a propylene-ethylene random copolymer (C2) in the presence of the propylene (co)polymer (C1).

Alternatively, the propylene resin component (C) may be a propylene homopolymer or a propylene-α-olefin random copolymer.

Or, a propylene resin may be continuously produced by, in a first step, producing a propylene (co)polymer (C) which satisfies conditions (C-i) and (C-ii) and subsequently, in a second step, producing a propylene-α-olefin random copolymer component of propylene and a $C_2$ and/or $C_{4-8}$ α-olefin in the presence of the propylene (co)polymer (C). In this case, if the component produced in the second step is a propylene-α-olefin random copolymer component wherein the content of the $C_2$ and/or $C_{4-8}$ α-olefin is more than 10 wt % and up to 30 wt %, the component produced in the second step can be regarded as component (A2).

Preferred examples of specific methods of production are described in Japanese Patent Application Laid-open Nos. 2006-35516 and 2001-172454, the entire contents of which are incorporated herein by reference.

It is also possible to suitably select and use component (C) from among commercially available products. Illustrative examples of commercially available products include NOVATEC PP (available under this trade name from Japan Polypropylene Corporation), NEWCON (available under this trade name from Japan Polypropylene Corporation), and ZELAS (available under this trade name from Mitsubishi Chemical Corporation). In using these, a grade which satisfies the melting peak temperature and MFR that are conditions of the invention should be suitably selected.

(3-3) Proportion of Component (C) in Inner Layer Components

The proportion of component (C) in the inner layer (1) is required in a range of from 1 to 20 wt % per 100 wt % of above components (A), (B) and (C) combined.

When the amount of component (C) is too low, the high-crystallinity component will be inadequate and it will not be possible to obtain a sufficient thinning suppressing effect. Hence, this amount must be at least 1 wt %, and is preferably at least 2 wt %, and more preferably at least 5 wt %. Conversely, when the amount of component (C) is too high, decreases in physical properties such as flexibility and transparency tend to become conspicuous, making it difficult to satisfy the quality required of the inventive resin composition. Hence, this amount must be preferably not more than 20 wt %, and more preferably not more than 15 wt %.

2. Outer Layer (2)

The outer layer (2) of the multilayer sheet of the invention is formed of a propylene resin composition (Y)

(1) Properties of Propylene Resin Composition (Y)

It is essential that the propylene resin composition (Y) (also referred to below as "component (Y)") used as the outer layer (2) of the multilayer propylene resin sheet of the invention have an excellent transparency and heat resistance. To obtain a transparency and flexibility as a multilayer sheet, not only the inner layer (1), but also the outer layer (2) must be made transparent. Moreover, the outer layer (2) must also have heat resistance, in addition to which it is necessary that it does not deform even when subjected to heat treatment such as disinfection or sterilization, and that it does not stick to the heat sealing bar during heat-sealing (fabrication).

To satisfy these requirements at a high level, it is essential that the propylene resin composition (Y) be a propylene resin (D) (also referred to below as "component (D)") which has a melting peak temperature Tm (D) in the range of from 150 to 170° C.

(D-i) Melting Peak Temperature Tm (D)

It is critical for component (D) to have a melting peak temperature Tm (D) in the range of 150 to 170° C., preferably from 155 to 170° C., and more preferably from 158 to 168° C.

When Tm (D) is less than 150° C., the heat resistance is inadequate, as a result of which the outer layer (2) sticks to the heat sealing bar during heat sealing. At Tm (D) above 170° C., industrial production is difficult.

(D-ii) Melt Flow Rate (MFR (D))

Component (D) must have suitable flow properties in order to obtain a good formability that does not cause interface roughness and surface roughness during lamination and does not give rise to problems such as thickness variations. The melt flow rate MFR (at 230° C. and a load of 2.16 kg) (sometimes referred to below as "MFR (D)"), which is a measure of flowability, is in the range of preferably 2 to 20 g/10 min, more preferably 2 to 15 g/10 min, and still more preferably 4 to 15 g/10 min.

At a MFR (D) below 2 g/10 min, interfacial roughness and surface roughness tend to arise, as a result of which a sheet having a good appearance may not be obtained. On the other hand, at a MFR (D) in excess of 20 g/10 min, thickness variations readily arise, and formability is often difficult.

Here, the MFR is a value measured in general accordance with JIS K7210.

(2) Method of Producing Component (D)

The propylene resin (D) used in the invention, so long as it satisfies the above melting point range, may be a propylene homopolymer, a random copolymer with another α-olefin, or a block copolymer with another α-olefin.

The propylene resin (D) used in the invention may be produced by any method. In cases where a composition (block copolymer) of a propylene (co)polymer component (D1) and a propylene-ethylene random copolymer (D2) is produced, the propylene resin (D) may be prepared using an apparatus which mixes a propylene (co)polymer (D1) and a propylene-ethylene random copolymer (D2) that have been separately produced, or the propylene resin (D) may be consecutively produced by first preparing a propylene (co)polymer (D1), then preparing a propylene-ethylene random copolymer (D2) in the presence of the propylene (co)polymer (D1).

It is also possible to suitably select and use component (D) from among commercially available products. Illustrative examples of commercially available products include NOVATEC PP (available under this trade name from Japan Polypropylene Corporation), NEWCON (available under this trade name from Japan Polypropylene Corporation), and ZELAS (available under this trade name from Mitsubishi Chemical Corporation). In using these, a grade which satisfies the melting peak temperature and MFR that are conditions of the invention should be suitably selected.

(3) Ethylene-α-Olefin Copolymer (D3)

The following elastomeric component (D3) may also be added to the propylene resin (D) so as to impart impact resistance at low temperature.

The elastomeric component which may be used in the outer layer (2) of the multilayer polypropylene resin sheet of the invention is exemplified by ethylene-α-olefin copolymers. Ethylene-α-olefin copolymers are copolymers obtained by the copolymerization of ethylene with an α-olefin having preferably from 3 to 20 carbons. Preferred examples of the α-olefin include those having from 3 to 20 carbons, such as propylene, 1-butene, 1-pentene, 1-hexene, 1-octene and 1-heptene.

Ethylene-α-olefin copolymers which may be advantageously used in this invention must have a density matching that of component (D) in order to make the refractive index difference with component (D) small. Moreover, to suppress tackiness and bleedout, it is desirable for the crystallinity and molecular weight distributions to be narrow. Hence, it is desirable to use an ethylene-α-olefin copolymer polymerized with a metallocene catalyst that is capable of providing a narrow crystallinity and a narrow molecular weight distribution.

The ethylene-α-olefin copolymer used as component (D3) may be suitably selected from among commercially available metallocene-based polyethylenes. Examples of commercial products include AFFINITY and ENGAGE (available under these trade names from DuPont-Dow), KERNEL (available under this trade name from Japan Polyethylene Corporation), and EXACT (available under this trade name from Exxon Mobil). In using these, a suitable density and MFR should be selected so as to avoid problems with transparency, tackiness and bleedout from arising.

Other exemplary elastomeric components include styrene-based elastomers. The styrene-based elastomer may be suitably selected and used from among those which are commercially available. Illustrative examples include hydrogenates of styrene-butadiene block copolymers available as Kraton G from Kraton Polymer Japan Co., Ltd. or under the trade name Tuftec from Asahi Chemical Industry Co., Ltd., hydrogenates of styrene-isoprene block copolymers available under the trade name Septon from Kuraray Co., Ltd., hydrogenates of styrene-vinyl polyisoprene block copolymers available under the trade name Hybrar from Kuraray Co., Ltd., and hydrogenates of styrene-butadiene random copolymers available under the trade name Dynaron from JSR Corporation.

(4) Component Ratios within Component (Y) in the Outer Layer

When component (D3), which may be advantageously used in the invention, is employed, it is preferable for the proportion of the outer layer (2) accounted for by component (D) to be in the range of 80 to 99 wt %, and it is preferable for the proportion of the outer layer (2) accounted for by component (D3) to be in the range from 1 to 20 wt %. The content of component (D) is more preferably from 85 to 95 wt %, and the content of component (D3) is more preferably from 5 to 15 wt %.

If the content of component (D) is less than 80 wt %, that is, if the content of component (D3) is 20 wt % or more, the heat resistance may be inadequate and deformation may arise in the heat treatment step. At a component (D) content of 99 wt % or more, i.e., at a component (D3) content of less than 1 wt %, the low temperature impact resistance-imparting effect is inadequate.

3. Innermost Layer (3)

Preferably, the multilayer sheet of the invention also has an innermost layer (3). That is, the multilayer sheet is composed of at least three layers which include, in order, an outer layer (1), an inner layer (2) and an innermost layer (3). This innermost layer (3) may be provided in order to, for example, control the heat-sealing properties of the multilayer sheet, or impart low-temperature sealability or easy peelability, although the purpose for providing this layer is of no particular concern here.

The resin composition (Z) used in the innermost layer is not subject to any particular limitation. Various types of resins may be used depending on the intended purpose, although it is preferable for this resin composition (Z) to have suitable flow properties which enable easy sheet formability so that interfacial roughness and surface roughness do not arise during lamination and problems such as thickness variation do not occur. The melt flow rate MFR (at 230° C. and 2.16 kg loading) is preferably in the range of 2 to 15 g/10 min, and more preferably from 2.5 to 10 g/10 min.

At a MFR (Z) of less than 2 g/10 min, interfacial roughness and surface roughness tend to arise, and a sheet having a good appearance may not be obtained. On the other hand, at a MFR (Z) greater than 15 g/min, thickness variations tends to arise and sheet formation may be difficult.

Here, MFR is a value measured in general accordance with JIS K7210.

A component preferred for use in the innermost layer is exemplified by a propylene resin composition containing a propylene-ethylene random copolymer (E) produced using a metallocene catalyst and an ethylene-α-olefin copolymer (F) produced using a metallocene catalyst.

Examples of commercial products that may be used as copolymer (E) include those available under the trade name WINTEC from Japan Polypropylene Corporation. Examples of commercial products that may be used as copolymer (F) include those available under the trade names AFFINITY and ENGAGE from DuPont-Dow, those available under the trade name KERNEL from Japan Polyethylene Corporation, and those available under the trade name EXACT from Exxon Mobil.

4. Additional Ingredients (Additives)

To enable the multilayer propylene resin sheet of the invention to be suitably employed as a multilayer sheet, propylene resin compositions (X), (Y) and (Z) used in, respectively, the inner layer (1), outer layer (2) and innermost layer (3) of the inventive multilayer sheet may include optional additives within ranges that do not significantly diminish the advantageous effects of the invention with regard to bleedout and the like. Such optional ingredients are exemplified by antioxidants, crystal nucleating agents, clarifiers, lubricants, antiblocking agents, antistatic agents, haze inhibitors, neutralizing agents, metal inactivators, colorants, dispersants, peroxides, fillers and fluorescent whiteners that are used in conventional polyolefin resin materials. Specific examples of the various additives are listed below. In addition, elastomers may be included as flexibility-imparting ingredients within a range which does not significantly diminish the advantageous effects of the invention.

(1) Antioxidants

Illustrative examples of antioxidants include phenolic antioxidants, such as tris(3,5-di-t-butyl-4-hydroxybenzyl)isocyanurate, 1,1,3-tris(2-methyl-4-hydroxy-5-t-butylphenyl) butane, octadecyl-3-(3,5-di-t-butyl-4-hydroxyphenyl) propionate, pentaerythrityltetrakis{3-(3,5-di-t-butyl-4-hydroxyphenyl)propionate}, 1,3,5-trimethyl-2,4,6-tris(3,5-di-t-butyl-4-hydroxybenzyl)benzene, 3,9-bis[2-{3-(3-t-butyl-4-hydroxy-5-methylphenyl)propionyloxy}-1,1-dimethylethyl]-2,4,8,10-tetraoxaspiro[5,5]undecane and 1,3,5-tris(4-t-butyl-3-hydroxy-2,6-dimethylbenzyl)isocyanuric acid.

Examples of phosphorus-based antioxidants include tris (mixed mono- and di-nonylphenylphosphite), tris(2,4-di-t-butylphenyl)phosphite, 4,4'-butylidenebis(3-methyl-6-t-butylphenyl-di-tridecyl)phosphite, 1,1,3-tris(2-methyl-4-di-tridecylphosphite-5-t-butylphenyl)butane, bis(2,4-di-t-butylphenyl)pentaerythritol diphosphite, tetrakis(2,4-di-t-butylphenyl)-4,4'-biphenylene diphosphite, tetrakis(2,4-di-t-butyl-5-methylphenyl)-4,4'-biphenylene diphosphite and bis (2,6-di-t-butyl-4-methylphenyl)pentaerythritol diphosphite.

Examples of sulfur-based antioxidants include distearyl thiodipropionate, dimyristyl thiodipropionate and pentaerythritol tetrakis(3-lauryl thiopropionate).

These antioxidants may be used singly or as combinations of two or more thereof, insofar as the advantageous effects of the invention are not compromised.

The amount of antioxidant included per 100 parts by weight of the respective resins is from 0.01 to 1.0 part by weight, preferably from 0.02 to 0.5 parts by weight, and more preferably from 0.05 to 0.1 parts by weight. If the amount included is below the above range, a thermal stability effect is not obtained and deterioration takes place when the resin is produced, causing scorching and fisheyes. On the other hand, at an amount in excess of the above range, the additive itself becomes a foreign matter, causing fisheyes, which is undesirable.

(2) Antiblocking Agents

The antiblocking agent has an average particle size of from 1 to 7 μm, preferably from 1 to 5 μm, and more preferably from 1 to 4 μm. At an average particle size below 1 μm, the slip characteristics and bag openability diminish, which is undesirable. On the other hand, at more than 7 μm, the transparency and tendency to scratch markedly worsen, which is undesirable. Here, the average particle size is a value measured by the coal tar counter method.

Examples of antiblocking agents that may be used include inorganic agents such as synthetic or natural silicas (silicon dioxide), magnesium silicate, aluminosilicates, talc, zeolites, aluminum borate, calcium carbonate, calcium sulfate, barium sulfate and calcium phosphate.

Examples of organic antiblocking agents include polymethyl methacrylate, polymethylsilsesquioxane (silicone), polyamides, polytetrafluoroethylene, epoxy resins, polyester resins, benzoguanamine formaldehyde (urea resin) and phenolic resins.

Synthetic silicas and polymethyl methacrylate are especially preferred from the standpoint of balance in dispersibility, transparency, antiblocking properties and scratch resistance.

The antiblocking agent may be one that has been surface-treated. Examples of surface treatment agents which may be used include surfactants, metal soaps, organic acids such as acrylic acid, oxalic acid, citric acid and tartaric acid, higher alcohols, esters, silicones, fluoroplastics, silane coupling agents and condensed phosphates such as sodium hexametaphosphate, sodium pyrophosphate, sodium tripolyphosphate and sodium trimetaphosphate. Organic acid treatment, particularly citric acid treatment, is especially preferred. The method of treatment is not subject to any particular limitation. Use may be made of a known method, such as surface spraying or dipping.

The particles of antiblocking agent may have any shape. For example, they may have a shape that is spheroidal, angular, columnar, needle-like, plate-like or amorphous.

These antiblocking agents may be used singly or as combinations of two or more thereof, insofar as the advantageous effects of the invention are not compromised.

The amount of antiblocking agent compounded per 100 parts by weight of resin is typically from 0.01 to 1.0 part by weight, preferably from 0.05 to 0.7 parts by weight, and more preferably from 0.1 to 0.5 parts by weight. When the amount included is less than the above range, the sheet antiblocking properties, slip characteristics and bag openability tend to decrease. When the amount is greater than the above range, a loss tends to occur in the transparency of the sheet or the antiblocking agent itself becomes foreign matter and causes fisheyes, which is undesirable.

(3) Slip Agents

Exemplary slip agents include monoamides, substituted amides and bisamides. Any one or combinations of two or more of these may be used.

Examples of monoamides include saturated fatty acid monoamides, such as laurylamide, palmitamide, stearamide, behenamide and hydroxystearamide.

Examples of unsaturated fatty acid monoamides include oleamide, erucamide and ricinolamide.

Examples of substituted amides include N-stearyl stearamide, N-oleyl oleamide, N-stearyl oleamide, N-oleyl stearamide, N-stearyl erucamide and N-oleyl palmitamide.

Examples of bisamides include saturated fatty acid bisamides such as methylenebis(stearamide), ethylenebis(capramide), ethylenebis(lauramide), ethylenebis(stearamide), ethylenebis(isostearamide), ethylenebis(hydroxystearamide), ethylenebis(behenamide), hexamethylenebis(stearamide), hexamethylenebis(behenamide), hexamethylenebis(hydroxystearamide), N,N'-distearyladipamide and N,N'-distearylsebacamide.

Examples of unsaturated fatty acid bisamides include ethylenebis(oleamide), hexamethylenebis(oleamide), N,N'-dioleyl adipamide, N,N'-dioleyl sebacamide.

Examples of aromatic bisamides include m-xylylenebis (stearamide) and N,N'-distearyl isophthalamide.

Of these, among the fatty acid amides, the use of oleamide, erucamide and behenamide is especially preferred.

The amount of slip agent compounded per 100 parts by weight of the resin is typically from 0.01 to 1.0 part by weight, preferably from 0.05 to 0.7 parts by weight, and more preferably from 0.1 to 0.4 parts by weight. Below the foregoing range, the bag openability and slip characteristics tend to be poor. Above the foregoing range, floating up of the strip agent becomes excessive, as a result of which the slip agent bleeds to the sheet surface, worsening the transparency.

(4) Nucleating Agent

Illustrative examples of nucleating agents include sodium 2,2-methylenebis(4,6-di-t-butylphenyl)phosphate, talc, sorbitol compounds such as 1,3,2,4-di(p-methylbenzylidene)sorbitol, hydroxy-di(t-butylbenzoic acid)aluminum, 2,2-methylenebis(4,6-di-t-butylphenyl)phosphoric acid, and lithium $C_{8-20}$ aliphatic monocarboxylate mixtures (available from ADEKA under the trade name NA21).

The above nucleating agent is included in an amount per 100 parts by weight of the respective resins of typically from 0.0005 to 0.5 parts by weight, preferably from 0.001 to 0.1 parts by weight, and more preferably from 0.005 to 0.05 parts by weight. Below the foregoing range, effects as a nucleating agent are not obtained. Above the foregoing range, the nucleating agent itself becomes a foreign matter, causing fisheyes, which is undesirable.

Examples of nucleating agents other than the above include high-density polyethylene resins. The high-density polyethylene resin has a density of typically from 0.94 to 0.98 $g/cm^3$, and preferably from 0.95 to 0.97 $g/cm^3$. At densities outside this range, a transparency-improving effect cannot be obtained. The melt flow rate (MFR) of the high-density polyethylene resin at 190° C. is typically at least 5 g/10 min, preferably from 7 to 500 g/10 min, and more preferably from 10 to 100 g/10 min. At a MFR below 5 g/10 min, the size of dispersed particles of high-density polyethylene resin does not become sufficiently small, as a result of which the high-density polyethylene resin itself becomes a foreign matter, causing fisheyes, which is undesirable. Also, in order for the high-density polyethylene resin to microdisperse, it is preferable for the high-density polyethylene resin have a higher MFR than the MFR of the propylene resin in the invention.

Production of the high-density polyethylene resin used as a nucleating agent is not subject to any particular limitation concerning the method of production and the catalyst, so long as a polymer having the desired physical properties can be obtained. Exemplary catalysts include Ziegler-Natta catalysts (i.e., catalysts based on a combination of a supported or unsupported halogen-containing titanium compound and an organoaluminum compound) and Kaminsky catalysts (catalysts based on a combination of a supported or unsupported metallocene compound and an organoaluminum compound, particularly an alumoxane). The shape of the high-density polyethylene resin is not subject to any particular limitation, and may be in the form of pellets or in powder form.

When used as a nucleating agent, the amount of high-density polyethylene compounded per 100 parts by weight of the resin is typically form 0.01 to 5 parts by weight, preferably from 0.05 to 3 parts by weight, and more preferably from 0.1 to 1 part by weight. Below the foregoing range, effects as a nucleating agent are not obtained. Above the foregoing range, the high-density polyethylene itself becomes a foreign matter, causing fisheyes, which is undesirable.

(5) Neutralizing Agent

Illustrative examples of neutralizing agents include calcium stearate, zinc stearate, hydrotalcite and Mizukalac (available from Mizusawa Industrial Chemicals, Ltd.).

When a neutralizing agent is included, the amount compounded per 100 parts by weight of the resin is typically from 0.01 to 1.0 part by weight, preferably from 0.02 to 0.5 parts by weight, and more preferably from 0.05 to 0.1 parts by weight. At an amount below the foregoing range, because effects as a neutralizing agent are not obtained, deteriorated resin at the interior of the extruder is scraped out, causing fisheyes. Above the foregoing range, the neutralizing agent itself becomes a foreign matter, causing fisheyes, which is undesirable.

(6) Light Stabilizers

Hindered amine stabilizers are suitably used as the Light stabilizer. Compounds known to the art which have a structure wherein all the hydrogens bonded to the carbons at the 2 and 6 positions of piperidine have been substituted with methyl groups may be used without particular limitation. Examples of compounds that may be used include those listed below.

Illustrative examples include polycondensates of dimethyl succinate with 1-(2-hydroxyethyl)-4-hydroxy-2,2,6,6-tetramethylpiperidine, tetrakis(1,2,2,6,6-pentamethyl-4-piperidyl) 1,2,3,4-butanetetracarboxylate, bis(1,2,2,6,6-pentamethyl-4-piperidyl)sebacate, the condensate of N,N-bis(3-aminopropyl)ethylenediamine with 2,4-bis[N-butyl-N-(1,2,2,6,6-pentamethyl-4-piperidyl)amino]-6-chloro-1,3,5-triazine, bis(2,2,6,6-tetramethyl-4-piperidyl)sebacate, poly[{6-(1,1,3,3-tetramethylbutyl)imino-1,3,5-triazine-2,4-diyl}{(2,2,6,6-tetramethyl-4-piperidyl)imino}hexamethylene{2,2,6,6-tetramethyl-4-piperidyl}imino] and poly[(6-morpholino-s-triazine-2,4-diyl)[(2,2,6,6-tetramethyl-4-piperidyl)imino]hexamethylene{(2,2,6,6-tetramethyl-4-piperidyl)imino}].

These hindered amine stabilizers may be used singly or as a combination of two or more thereof, insofar as the advantageous effects of the invention are not compromised.

In cases where a hindered amine stabilizer is included, it is desirable for the amount compounded per 100 parts by weight of the resin to be from 0.005 to 2 parts by weight, preferably from 0.01 to 1 part by weight, and more preferably from 0.05 to 0.5 parts by weight.

At a hindered amine stabilizer content below 0.005 parts by weight, there is no stability (e.g., heat resistance, antidegrading property) improving effect, whereas at above 2 parts by weight, the stabilizer itself becomes a foreign matter, causing fisheyes, which is undesirable.

(7) Antistatic Agent

Known additives that have hitherto been used as antistatic agents may be employed here as antistatic agents without any particular limitation. Exemplary antistatic agents include anionic surfactants, cationic surfactants, nonionic surfactants and amphoteric surfactants.

Illustrative examples of anionic surfactants include carboxylates such as fatty acid or resin acid soaps, N-acylcarboxylates, ether carboxylates and fatty acid amine salts; sulfonates such as sulfosuccinates, ester sulfonates and N-acylsulfonates; sulfates such as sulfated oils, sulfuric acid esters, alkyl sulfates, alkylpolyoxyethylene salts of sulfuric acids, ether sulfates and amide sulfates; and phosphates such as alkyl phosphates, alkylpolyoxyethylene salts of phosphoric acid, ether phosphates and amide phosphates.

Illustrative examples of cationic surfactants include amine salts such as alkylamine salts, quaternary ammonium salts such as alkyltrimethylammonium chloride, alkylbenzyldimethylammonium chloride, alkyldihydroxyethylmethylammonium chloride, dialkyldimethylammonium chloride, tetraalkylammonium salts, N,N-di(polyoxyethylene)dialkylammonium salts and ammonium salts of N-alkylalkanamides; alkylimidazoline derivatives such as 1-hydroxyethyl-2-alkyl-2-imidazoline and 1-hydroxyethyl-1-alkyl-2-alkyl-2-imidazoline; and imidazolinium salts, pyridinium salts and isoquinolium salts.

Illustrative examples of nonionic surfactants include those in the form of ethers, such as alkylpolyoxyethylene ethers and p-alkylphenylpolyoxyethylene ethers; those in the form of ether esters, such as fatty acid sorbitan polyoxyethylene ethers, fatty acid sorbitol polyoxyethylene ethers and fatty acid glycerol polyoxyethylene ethers; those in the form of esters, such as fatty acid polyoxyethylene esters, monoglycerides, diglycerides, sorbitan esters, sucrose esters, dihydric alcohol esters and boric acid esters; and those in the form of nitrogen-containing compounds, such as dialcohol alkylamines, dialcohol alkylamine esters, fatty acid alkanolamides, N,N-di(polyoxyethylene)alkanamides, alkanolamine esters, N,N-di(polyoxyethylene)alkanamines, aminoxides and alkylpolyethyleneimines.

Illustrative examples of amphoteric surfactants include those in the form of amino acids, such as monoaminocarboxylic acids and polyaminocarboxylic acids; those in the form of N-alkyl-β-alanines, such as N-alkylaminopropionic acid salts and N,N-di(carboxymethyl)alkylamine salts; those in the form of betaines, such as N-alkylbetaines, N-alkylamide betaines, N-alkylsulfobetaines, N,N-di(polyoxyethylene)alkylbetaines and imidazolium betaine; and alkylimidazoline derivatives, such as 1-carboxymethyl-1-hydroxy-1-hydroxyethyl-2-alkyl-2-imidazoline and 1-sulfoethyl-2-alkyl-2-imidazoline.

Of these, nonionic surfactants and amphoteric surfactants are preferred. Nonionic surfactants, either in the form of esters, such as monoglycerides, diglycerides, boric acid esters, dialcohol alkylamines, dialcohol alkylamine esters and amides, or in the form of nitrogen-containing compounds, and amphoteric surfactants in the form of betaines are especially preferred.

Commercial products may be used as the antistatic agent. Illustrative examples include Electrostripper TS5 (glycerol monostearate, available under this trade name from Kao Corporation), Electrostripper TS6 (stearyl diethanolamine, available under this trade name from Kao Corporation), Electrostripper EA (lauryl diethanolamine, available under this trade name from Kao Corporation), Electrostripper EA-7 (polyoxyethylene laurylamine capryl ester, available under this trade name from Kao Corporation), Denon 331P (stearyl diethanolamine monostearate, available under this trade name from Maruzen Chemical Trading Co., Ltd.), Denon 310 (alkyl diethanolamine fatty acid monoester, available under this trade name from Maruzen Chemical Trading Co., Ltd.), Resistat PE-139 (stearic acid mono and diglyceride boric acid esters, available under this trade name from Dai-ichi Kogyo Seiyaku Co., Ltd.), Chemistat 4700 (alkyl dimethylbetaine, available under this trade name from Sanyo Chemical Industries, Ltd.) and Leostat S (alkyl diethanolamide, available under this trade name from Lion Corporation).

When an antistatic agent is included, the amount compounded per 100 parts by weight of resin is typically from 0.01 to 2 parts by weight, preferably from 0.05 to 1 part by weight, more preferably from 0.1 to 0.8 parts by weight, and even more preferably from 0.2 to 0.5 parts by weight. These antistatic agents may be used singly or as combinations of two or more thereof, insofar as the advantageous effects of the invention are not compromised. At an amount below 0.01 parts by weight, the antistatic agent is unable to reduce the surface resistivity and prevent damage due to static electricity. At more than 2 parts by weight, the surface of the sheet has a tendency to shed powder due to bleeding.

The elastomer in the invention is exemplified by styrene-based elastomers. Commercial products include Kraton G (available from Kraton Polymer Japan Co., Ltd.), Hybrar (available under this trade name from Kuraray Co., Ltd.) and Dynaron (available under this trade name from JSR Corporation).

[II] Production of Resin Compositions for Respective Layers of Multilayer Propylene Resin Sheet The propylene resin composition (X) making up the inner layer (1) in the multilayer propylene resin sheet of the invention is obtained by a method which involves mixing the above-described propylene resin composition (A), ethylene-α-olefin copolymer (B), propylene resin (C), and other added ingredients as needed in, for example, a Henschel mixer, V blender, ribbon blender or tumbler blender, followed by kneading in a kneader such as a single-screw extruder, a multi-screw extruder, a kneader or a Banbury mixer.

The propylene resin composition (Y) making up the outer layer (2) in the multilayer propylene resin sheet of the invention is obtained by a method which involves mixing the above-described propylene resin (D) and other added ingredients as needed in, for example, a Henschel mixer, V blender, ribbon blender or tumbler blender, followed by kneading in a kneader such as a single-screw extruder, a multi-screw extruder, a kneader or a Banbury mixer.

The propylene resin composition (Z) making up the innermost layer (3) in the multilayer propylene resin sheet of the invention is obtained by a method which involves mixing the desired resin components and other added ingredients as needed in, for example, a Henschel mixer, V blender, ribbon blender or tumbler blender, followed by kneading in a kneader such as a single-screw extruder, a multi-screw extruder, a kneader or a Banbury mixer.

The respective components may be mixed at the same time, or a portion may be prepared as a masterbatch, then mixed and kneaded.

[III] Multilayer Propylene Resin Sheet

The multilayer propylene resin sheet of the invention can be produced by a known method using the above-described propylene resin compositions. Production is carried out by a known technique, such as extrusion using a T-die or a circular die.

The multilayer propylene resin sheet of the invention has an excellent flexibility, transparency, impact resistance, heat resistance and cleanliness, and is able to suppress a loss of transparency due to appearance defects such as thickness irregularities and interfacial roughness. Moreover, the productivity is enhanced because thinning of the sheet during fabrication operations such as heat sealing can be suppressed, enabling a good mechanical strength to be maintained and excellent low-temperature heat sealability to be achieved. As a result, the sheet is ideally suited for use in heat-treatable packaging bags which must undergo a heat treatment operation such as disinfection or sterilization, and particularly IV infusion bags.

The multilayer polypropylene resin sheet of the invention is characterized by having an excellent flexibility even after heat treatment. It is desirable that the sheet have a tensile modulus, which is a measure of flexibility, of 400 MPa or less. At a tensile modulus of 400 MPa or less, preferably 380 MPa or less, and more preferably 350 MPa or less, the sheet ceases to feel stiff, and thus it has a good hand and is able to convey a sense of quality, which is a remarkable feature.

The multilayer propylene resin sheet of the invention, by having an internal haze (a measure of transparency) following heat treatment of 15% or less, preferably 13% or less, and more preferably 10% or less, allows the contents to be clearly seen, a quality which is highly desirable in that it enables one to check whether foreign matter is present in the bag contents.

The multilayer propylene resin sheet of the invention has an impact resistance, particularly at a very low temperature of −25° C., for example, which is excellent. In an impact strength test at −25° C., which is a measure of the low-temperature impact resistance, the sheet has an excellent impact resistance of 5 kJ/m or more. This is an excellent result in that it allows the sheet to be used as a product which will not fail even should it be dropped during, for example, transport or storage.

In addition, the multilayer propylene resin sheet of the invention has an excellent heat resistance. Namely, it exhibits an outstanding heat resistance without deformation even when heat treatment at about 121° C. is carried out. A deformed sheet has a bad appearance and a reduced product value, making it unfit for use as a product.

Furthermore, the multilayer propylene resin sheet of the invention has an excellent cleanliness. In the innermost layer (3) which comes into contact with the contents, it is desirable to employ a propylene resin composition which is obtained using a metallocene catalyst and has exceedingly low contents of low-molecular weight components and low-regularity components that may contaminate the contents.

EXAMPLES

To more concretely and clearly explain the invention, the invention is illustrated below by contrasting examples of the invention with comparative examples, thereby demonstrating the sense and significance of the constitution of the invention. However, the invention is not limited by these examples. The physical property measurement methods, methods of characterization and resin materials used in the examples and comparative examples are described below.

1. Resin Property Measurement Methods
(1) MFR

Propylene resin composition (A), propylene resin (C) and propylene resin (D) were measured in accordance with JIS K7210, Method A, Condition M; namely, at a test temperature of 230° C., a nominal load of 2.16 kg, and a die shape having a diameter of 2.095 mm and a length of 8.00 mm.

Ethylene-α-olefin copolymer (B) was measured in accordance with JIS K7210, Method A, Condition D; namely, at a test temperature of 190° C., a nominal load of 2.16 kg, and a die shape having a diameter of 2.095 mm and a length of 8.00 mm.

(2) Density

The density was measured by the density gradient tube method in general accordance with JIS K7112, Method D.

(3) Melting Peak Temperature

A differential scanning calorimeter (DSC) manufactured by Seiko Instruments, Inc. was used. After placing a 5.0 mg sample in the calorimeter and holding it at 200° C. for 5 minutes, the sample was crystallized by lowering the temperature to 40° C. at a ramp-down rate of 10° C./min, then melted at a ramp-up rate of 10° C./min, at which time the melting peak temperature was measured.

(4) α-Olefin Content of A2 (α [A2])

This was measured by infrared absorption spectroscopy. Because the α-olefin content in A2 cannot be directly measured, this was determined by calculation from the α-olefin contents of the propylene resin composition and A1, and from the A2 component content obtained by inductively coupled plasma emission spectrometry (ICP).

2. Evaluation Methods for Multilayer Sheet
(1) Heat Resistance

The multilayer propylene resin sheet having a tubular shape was cut to a size of 210 mm in the machine direction, and one of the cut sides was heat-sealed (heat-sealing conditions: pressure, 3.4 kgf/cm$^2$; time, 1.5 seconds; temperature, 150° C.; using a heat sealer manufactured by Tester Sangyo Co., Ltd.) and formed into a bag shape. Next, the interior was filled with 500 mL of pure water, and the other cut side was sealed by heat-sealing with an impulse sealer. Sealing was carried out such that the distance between the two heat seals was 200 mm. The sample bag thus obtained was placed in a high-temperature and high-pressure cooking sterilization tester (RCS-40 RTGN, manufactured by Hisaka Works, Ltd.), after which pressure was applied and the ambient temperature was raised to and held at 121° C. for 30 minutes. This was followed by cooling to about 40° C., whereupon the sample bag was removed from the tester (the multilayer sheet (sample bag) which has been subjected to this sterilization treatment is sometimes referred to below as "the heat-treated multilayer sheet").

The heat resistance of the heat-treated multilayer sheet was evaluated according to the following criteria.

NG: Not fit for use owing to deformation, wrinkling or internal fusion.

Good: Condition is good, with deformation, wrinkling or internal fusion either entirely absent or of such a slight degree as to allow use.

(2) Transparency (Internal Haze)

Following heat treatment, slide glasses were bonded to both sides of the laminated sheet with liquid paraffin, and the transparency was measured with a hazemeter in general accordance with JIS K7136-2000. A smaller value signifies better transparency. A value of 15% or less is good because the contents are easy to check, giving a display effect. The value is preferably 13% or less, and more preferably 10% or less.

(3) Flexibility (Tensile Modulus)

The tensile modulus of the heat-treated laminated sheet was measured under the following conditions in the machine direction (MD) in accordance with JIS K-7127-1989. A smaller value signifies better flexibility. A value of 400 MPa or less is desirable because the bag has a good hand, giving it a sense of quality. The value is preferably 380 MP or less, and more preferably 350 MPa or less.

Sample length: 150 mm
Sample width: 15 mm
Chuck interval: 100 mm
Crosshead speed: 1 mm/min (4) Impact Strength (Units: KJ/m)

The amount of work required for perforation failure per unit film thickness was measured using a film impact tester (from Toyo Seiki). Specifically, a laminated sheet following heat treatment was conditioned by being left to stand in a −25° C. environment for at least 24 hours, following which, at −25° C., the test film was attached to a 50 mm diameter holder and struck with a 25.4 mm diameter hemispherical metal perforator. The fragility of the film to impact was measured from the work (KJ) required for perforation failure.

(5) Cumulative Dropped Body Test (Units: cm)

A cumulative dropped body test was performed as an indicator of fabricability. When the sealed area of a laminated sheet undergoes thinning during fabrication (heat sealing), the region at the edge of the seal in particular undergoes a decrease in strength. Hence, the laminated sheet, when dropped while filled with water, ruptures more readily from the region at the edge of the seal.

The following impact resistance test (cumulative bag drop test) was carried out on a shaped body that was heat-sealed at a heat-sealing temperature of 150° C. as in the above-described heat resistance test.

A heat-treated multilayer sheet filled with water was conditioned at 4° C. for 48 hours, following which, at that temperature, it was dropped twice onto an iron plate from a height of 50 cm. If the bag did not break, it was dropped twice from a height of 100 cm. If the bag still did not break, it was then dropped twice from a height of 150 cm. If the bag still remained unbroken, it was finally dropped twice from a height of 200 cm. It is desirable that failure does not occur even when the bag is dropped from 100 cm, preferable that failure does not occur even when the bag is dropped from 150 cm, and more preferable that failure does not occur even when the bag is dropped from 200 cm. The greatest height at which rupture does not occur was used as the indicator of the fabricability.

3. Resins Used (1) Propylene Resin Composition (A) for Inner Layer

Propylene resin compositions (A-1) to (A-12) obtained by successive polymerization in Production Examples (A-1) to (A-12) below were used.

Production Example A-1

1) Preparation of Olefin Polymer Catalyst

A mixed solution was formed by charged a nitrogen-flushed glass flask with 60 mL of titanium tetrachloride and 40 mL of toluene. Next, a suspension prepared separately using 20 g of diethoxymagnesium having an average particle size of 42 μm, 100 mL of toluene and 7.2 mL of di-n-butyl phthalate was added to the mixed solution which was held to a liquid temperature of 10° C. The temperature was subsequently raised from 10° C. to 90° C. over a period of 80 minutes and reaction was carried out for 2 hours under stirring. Following reaction completion, the resulting solid product was rinsed four times with 200 mL of 90° C. toluene, then another 60 mL of titanium tetrachloride and 140 mL of toluene were added, the temperature was raised to 112° C., and reaction was again carried out for 2 hours under stirring. Following reaction completion, the resulting solid product was rinsed ten times with 200 mL of 40° C. n-heptane, giving an olefin polymerization catalyst (A-1). The resulting olefin polymerization catalyst had an average particle size of 42 μm, and was composed of 18.9 wt % of magnesium, 2.2 wt % of titanium and 61.6 wt % of chlorine.

2) Pre-Activation of Polyolefin Polymerization Catalyst Component

A 20-liter stainless steel reactor with inclined vanes was flushed with nitrogen, then charged at room temperature with 17.7 L of hexane, 100.6 mmol of triethylaluminum, 15.1 mmol of diisopropyldimethoxysilane and 120.4 g of the polyolefin polymerization catalyst (A-1) prepared in the preceding section, following which the reactor contents were warmed to 30° C. Next, 240.8 g of propylene was fed in over a period of 3 hours under stirring, thereby carrying out pre-activation. Analysis showed that 1.9 g of propylene had reacted per gram of olefin polymerization catalyst.

3) First Polymerization Step

A horizontal polymerizer (L/D=6; capacity, 100 liters) equipped with stirring blades was continuously charged with 0.4 g/hr of the pre-activated olefin polymerization catalyst and with triethylaluminum as the organoaluminum compound and diisopropyldimethoxysilane as the organosilicon compound so as to set the Al/Mg molar ratio to 6 and the Al/Si molar ratio to 3. While maintaining the reaction temperature at 60° C., the reaction pressure at 2.1 MPa and the stirring speed at 35 rpm, an ethylene-propylene mixed gas and hydrogen as the molecular weight adjusting agent were continuously supplied. The ethylene content and MFR of the polymer (A1) thus produced are shown in Table 1.

The propylene-α-olefin random copolymer (A1) product was continuously drawn off from the downstream portion of the polymerizer in such a manner as to keep the polymer retention level at 45 vol % of the reaction volume, and was fed to the reactor in the second polymerization step. At this time, portions of the distributed propylene-α-olefin random copolymer (A1) were intermittently collected and used as samples for measuring the ethylene content, MFR and polymer yield per unit weight of catalyst. The polymer yield per unit weight of catalyst was calculated from the magnesium content in the polymer that was measured by inductively coupled plasma spectrometry (ICP).

4) Second Polymerization Step

The propylene-α-olefin random copolymer (A1) from the first polymerization step and ethylene-propylene mixed gas were continuously fed to a horizontal polymerizer (L/D=6; capacity, 100 liters) equipped with stirring blades, and the copolymerization of ethylene and propylene was carried out. The reaction was carried out under the following conditions: stirring speed, 25 rpm; temperature, 55° C.; pressure, 1.9 MPa. Carbon monoxide as a polymerization activity suppressing agent for regulating the degree of polymerization of the propylene-α-olefin random copolymer (A2) and hydrogen gas to adjust the molecular weight of the propylene-α-olefin random copolymer (A2) were each fed in.

The propylene resin produced in the second polymerization step was continuously drawn off from the downstream portion of the polymerizer in such a manner as to set the polymer retention level to 60 vol % of the reaction volume.

The propylene resin production rate was from 10 to 16 kg/hr.

Unreacted monomer was removed from the drawn off propylene resin, and a portion of the resin was furnished for the measurement of the MFR, measurement of the melting point, measurement of the ethylene content by infrared absorption spectroscopy, and measurement of the amount of copolymer (A2) produced via measurement of the magnesium content within the polymer by ICP.

The various analytic results obtained for the propylene resin (A-1) are shown in Table 1.

5) Granulation

In addition, 0.05 parts by weight of Antioxidant 1 below, 0.05 parts by weight of Antioxidant 2 below and 0.02 parts by weight of the neutralizing agent were added to 100 parts by weight of the propylene resin (A-1) obtained above and thoroughly stirred and mixed, then melt-blended in a PCM twin-screw extruder (screw bore, 30 mm; manufactured by Ikegai Seisakusho) at a screw speed of 200 rpm, a discharge rate of kg/hr and an extruder temperature of 200° C. The molten resin extruded from the strand die was taken up while being cooled and solidified in a cooling water tank. Using a strand cutter, the strand was cut to a diameter of about 2 mm and a length of about 3 mm, giving a propylene resin composition (A-1).

Antioxidant 1: Tetrakis[methylene-3-(3',5'-di-t-butyl-4'-hydroxyphenyl)propionate]methane (available from Ciba Specialty Chemicals under the trade name Irganox 1010)

Antioxidant 2: Tris(2,4-di-t-butylphenyl)phosphate (available from Ciba Specialty Chemicals under the trade name Irganox 168)

Neutralizing agent: Hydrotalcite (available from Kyowa Chemical Industry Co., Ltd. under the trade name DHT-4A)

Production Examples (A-2) to (A-7)

Aside from suitably changing the polymerization conditions, catalyst preparation, polymerization, analysis and granulation were carried out by the same methods as in Production Example (A-1).

The analytic results for the resulting propylene resin compositions (A-2) to (A-7) are shown in Table 1. These compositions satisfy all the requirements of the invention as component (A).

Production Examples (A-8) to (A-12)

Aside from suitably changing the polymerization conditions, catalyst preparation, polymerization, analysis and granulation were carried out by the same methods as in Production Example (A-1).

The analytic results for the resulting propylene resin compositions (A-8) to (A-12) are shown in Table 1. These compositions do not satisfy the requirements of the invention as component (A).

TABLE 1

|  | MFR g/10 min | Component A1 amount wt % | Component A1 MFR g/10 min | Component A2 amount wt % | E (A2) wt % | Tm (A1) °C. |
|---|---|---|---|---|---|---|
| A-1 | 6 | 61 | 5 | 39 | 17.5 | 147 |
| A-2 | 6 | 60 | 4 | 40 | 25 | 146 |
| A-3 | 6 | 61 | 10 | 39 | 20 | 140 |
| A-4 | 6 | 60 | 6 | 40 | 17.5 | 130 |
| A-5 | 6 | 62 | 4 | 38 | 25 | 132 |
| A-6 | 6 | 66 | 7 | 34 | 20 | 140 |
| A-7 | 6 | 42 | 6 | 58 | 20 | 140 |
| A-8 | 6 | 59 | 6 | 41 | 18 | 163 |
| A-9 | 6 | 75 | 6 | 25 | 18 | 142 |
| A-10 | 6 | 61 | 6 | 39 | 35 | 142 |
| A-11 | 0.3 | 60 | 0.5 | 40 | 25 | 140 |
| A-12 | 25 | 61 | 30 | 39 | 25 | 140 |

(2) Ethylene-α-Olefin Copolymer (B) for Inner Layer

The ethylene-α-olefin copolymer (B-1) obtained by Production Example (B-1) below, and commercial products (B-2) and (B-3) below were used.

Production Example (B-1)

A copolymer of ethylene and 1-hexene was produced. Catalyst preparation was carried out by the method described in Japanese Translation of PCT Application No. H7-508545 (preparation of catalyst system). That is, a catalyst solution was prepared by adding to 2.0 mmol of the complex dimethylsilylenebis(4,5,6,7-tetrahydroindenyl)hafnium dimethyl an equimolar amount of tripentafluorophenylboron, then diluting to 10 liters with toluene.

A mixture of ethylene and 1-hexene was fed to a stirring autoclave-type continuous reactor having a capacity of 1.5 liters in such a way as to set the 1-hexene content to 73 wt %, and the reaction was carried out at 127° C. while maintaining the pressure inside the reactor at 130 MPa. The amount of polymer produced per hour was about 2.5 kg.

Next, 0.05 parts by weight of Antioxidant 1 below and 0.05 parts by weight of Antioxidant 2 below were added to 100 parts by weight of the resulting polymer, and thoroughly stirred and mixed, then melt-blended in a PCM twin-screw extruder (screw bore, 30 mm; manufactured by Ikegai Seisakusho) at a screw speed of 200 rpm, a discharge rate of 10 kg/hr and an extruder temperature of 180° C. The molten resin extruded from the strand die was taken up while being cooled and solidified in a cooling water tank. Using a strand cutter, the strand was cut to a diameter of about 2 mm and a length of about 3 mm, giving an ethylene-hexene copolymer (B-1) composition.

Antioxidant 1: Tetrakis[methylene-3-(3',5'-di-t-butyl-4'-hydroxyphenyl)propionate]methane (available from Ciba Specialty Chemicals under the trade name Irganox 1010)

Antioxidant 2: Tris(2,4-di-t-butylphenyl)phosphate (available from Ciba Specialty Chemicals under the trade name Irganox 168)

The resulting ethylene-hexene copolymer (B-1) composition had an MFR of 2.2 and a density of 0.898.

(B-2): Ethylene-1-octene copolymer synthesized with metallocene catalyst (Affinity EG8200G, available under this trade name from Dow Chemical Japan)

(B-3): Ethylene-1-hexene copolymer synthesized with metallocene catalyst (Kernel KF380, available under this trade name from Japan Polyethylene Corporation)

The MFR and Tm (B) for each of these resins are shown in Table 2. Of these, (B-3) does not satisfy the requirements of the present invention as component (B).

TABLE 2

|  |  | B-1 | B-2 | B-3 |
|---|---|---|---|---|
| MFR | g/10 min | 2.2 | 5 | 4 |
| Density | g/cc | 0.898 | 0.87 | 0.918 |

(3) Propylene Resin (C) for Inner Layer

The following commercially available polypropylene resins (synthesized with Ziegler catalysts) were used.

(C-1): NOVATEC PP MA3, a propylene homopolymer available under this trade name from Japan Polypropylene Corporation (C-2): NOVATEC PP FY6H, a propylene homopolymer available under this trade name from Japan Polypropylene Corporation (C-3): NOVATEC PP F203T, a propylene homopolymer available under this trade name from Japan Polypropylene Corporation (C-4): NOVATEC PP MG3F, a propylene-ethylene random copolymer available under this trade name from Japan Polypropylene Corporation (C-5): NOVATEC PP SA06A, a propylene homopolymer available under this trade name from Japan Polypropylene Corporation The MFR and Tm (C) values for these resins are shown in Table 3. Of these, (C-4) and (C-5) do not satisfy the requirements of the invention for component (C).

TABLE 3

|  | C-1 | C-2 | C-3 | C-4 | C-5 |
|---|---|---|---|---|---|
| MFR (g/10 min) | 11 | 1.9 | 2.5 | 8 | 60 |
| Tm (° C.) | 163 | 166 | 158 | 147 | 163 |

(4) Propylene Resin (D) for Outer Layer

The following commercially available propylene resins were used.

(D-1): NOVATEC PP MA3, a propylene homopolymer synthesized with a Ziegler catalyst, available under this trade name from Japan Polypropylene Corporation (D-2): NOVATEC PP MA3U, a propylene homopolymer synthesized with a Ziegler catalyst, available under this trade name from Japan Polypropylene Corporation (D-3): NOVATEC PP FY6, a propylene homopolymer synthesized with a Ziegler catalyst, available under this trade name from Japan Polypropylene Corporation (D-4): NOVATEC PP MA1B, a propylene homopolymer synthesized with a Ziegler catalyst, available under this trade name from Japan Polypropylene Corporation
(D-5): NOVATEC PP F203T, a propylene homopolymer synthesized with a Ziegler catalyst, available under this trade name from Japan Polypropylene Corporation
(D-6): WINTEC WFW4, a propylene-ethylene random copolymer synthesized with a metallocene catalyst, available under this trade name from Japan Polypropylene Corporation The MFR and Tm (D) values for these resins are shown in Table 4. Of these, (D-6) does not satisfy the requirements of the invention for component (D).

TABLE 4

|  | D-1 | D-2 | D-3 | D-4 | D-5 | D-6 |
|---|---|---|---|---|---|---|
| MFR (g/10 min) | 11 | 15 | 2.4 | 21 | 2.5 | 7 |
| Tm (° C.) | 163 | 166 | 163 | 163 | 158 | 135 |

(5) Propylene Resin Composition (Z) for Innermost Layer

The following propylene resin compositions (Z-1) to (Z-3) containing commercially available propylene resins and the like were used.
(Z-1): A composition of 80 wt % of the propylene-ethylene random copolymer WINTEC WFW4 (above resin (D-6)) and 20 wt % of an ethylene-hexene copolymer (above resin (B-1)).
(Z-2): A composition of 75 wt % of a propylene resin composition (above resin (A-3)), 20 wt % of an ethylene-hexene copolymer (above resin (B-1)) and 5 wt % of the polypropylene resin NOVATEC PP MA3 (above resin (C-1)).
(Z-3): A composition of 80 wt % of the propylene-ethylene random copolymer WINTEC WFW4 (above resin (D-6)) and 20 wt % of the SEBS elastomer Kraton G1657, available under this trade name from Kraton Polymer Japan.

Examples 1 to 11

Using a single-screw extruder having a 50 mm bore as the inner layer extruder and a single-screw extruder having a bore of 40 mm as the outer layer and innermost layer extruder, feedstock pellets for the various layers indicated in Tables 5 and 6 below were extruded at a temperature setting of 200° C. in the ratios indicated in the tables from a circular die having a mandrel diameter of 100 mm and a lip width of 3.0 mm, water-cooled, and water-cooled blown film extrusion was carried out at a speed of 10 m/min to a lay flat width of 200 mm, thereby giving a 200 μm thick tubular shaped body in a total thickness of the layer construction as indicated in the table.

Next, the resulting tubular shaped body composed of a laminated sheet was heat-treated by the above-described method, and then conditioned for at least 24 hours in a 23° C., 50% RH atmosphere, following which the properties of the laminated sheet were evaluated. The evaluation results are shown in Tables 5 and 6 below.

The laminated sheets which satisfy the conditions of the invention had an excellent transparency, flexibility, heat resistance, impact resistance, appearance and fabricability.

TABLE 5

| | | | | | Examples | | | | | |
|---|---|---|---|---|---|---|---|---|---|---|
| | | | | Units | 1 | 2 | 3 | 4 | 5 | 6 |
| Layer construction and formulations | Outer layer (Y) | Type | | | D1 | D1 | D1 | D1 | D1 | D1 |
| | | Thickness | | μm | 17 | 17 | 17 | 17 | 17 | 17 |
| | Inner layer (X) | Component (A) | Type | | A-1 | A-2 | A-3 | A-4 | A-5 | A-6 |
| | | | Ratio | wt % | 75 | 75 | 75 | 75 | 75 | 75 |
| | | Component (B) | Type | | B-1 | B-1 | B-1 | B-1 | B-1 | B-1 |
| | | | Ratio | wt % | 20 | 20 | 20 | 20 | 20 | 20 |
| | | Component (C) | Type | | C-1 | C-1 | C-1 | C-1 | C-1 | C-1 |
| | | | Ratio | wt % | 5 | 5 | 5 | 5 | 5 | 5 |
| | | Thickness | | μm | 166 | 166 | 166 | 166 | 166 | 166 |
| | Innermost layer (Z) | Type | | | Z-1 | Z-1 | Z-1 | Z-1 | Z-1 | Z-1 |
| | | Thickness | | μm | 17 | 17 | 17 | 17 | 17 | 17 |
| | Total thickness | | | μm | 200 | 200 | 200 | 200 | 200 | 200 |
| Film properties | Appearance | | | | good | good | good | good | good | good |
| | Internal haze | | | % | 9.5 | 14.2 | 9.5 | 6.3 | 12.6 | 9.8 |
| | Tensile modulus | | | MPa | 370 | 395 | 333 | 292 | 305 | 374 |
| | Impact strength | | | KJ/m | 9.5 | 9.8 | 10.1 | 10.2 | 10.1 | 9.7 |
| | Cumulative dropped body test (fabricability) | | | cm | 150 | 150 | 200 | 100 | 150 | 150 |

TABLE 6

| | | | | | Examples | | | | |
|---|---|---|---|---|---|---|---|---|---|
| | | | | Units | 7 | 8 | 9 | 10 | 11 |
| Layer construction and formulations | Outer layer (Y) | Type | | | D1 | D1 | D1 | D1 | D1 |
| | | Thickness | | μm | 17 | 29 | 20 | 20 | 20 |
| | Inner layer (X) | Component (A) | Type | | A-7 | A-3 | A-3 | A-3 | A-3 |
| | | | Ratio | wt % | 75 | 75 | 75 | 75 | 75 |
| | | Component (B) | Type | | B-1 | B-1 | B-1 | B-1 | B-1 |
| | | | Ratio | wt % | 20 | 20 | 20 | 20 | 20 |

TABLE 6-continued

|  |  |  |  | Units | Examples 7 | 8 | 9 | 10 | 11 |
|---|---|---|---|---|---|---|---|---|---|
|  |  | Component (C) | Type Ratio | wt % | C-1 5 | C-1 5 | C-1 5 | C-1 5 | C-1 5 |
|  |  | Thickness |  | μm | 166 | 142 | 160 | 160 | 160 |
|  | Innermost layer (Z) | Type Thickness |  | μm | Z-1 17 | Z-1 29 | Z-1 20 | Z-2 20 | Z-3 20 |
| Film properties |  | Total thickness Appearance Internal haze Tensile modulus Impact strength Cumulative dropped body test (fabricability) |  | μm % MPa KJ/m cm | 200 good 8.7 220 11.2 100 | 200 good 9.8 389 6.5 150 | 200 good 9.5 340 10.1 150 | 200 good 9.5 315 10.5 150 | 200 good 8.7 330 10.5 150 |

Comparative Examples 1 to 5

Aside from using the ingredients mentioned in Table 7 below, laminated sheets were obtained in the same way as in the above examples of the invention.

Evaluation results are shown in Table 7 below.

In Comparative Example 1, the melting peak temperature (Tm (A1)) for component (A) was too high, as a result of which the laminated sheet had a poor flexibility. In Comparative Example 2, the amount of propylene-α-olefin random copolymer component (A1) was too high, as a result of which the laminated sheet had a poor flexibility and impact resistance.

In Comparative Example 3, the α-olefin content of component (A) (α [A2]) was too high, as a result of which the laminated sheet was stiff and had a poor transparency. In Comparative Example 4, the MFR of component (A) was too low, resulting in appearance defects. In Comparative Example 5, the MFR of component (A) was too high, making stable sheet formation impossible.

TABLE 7

|  |  |  |  | Units | Comparative Examples 1 | 2 | 3 | 4 | 5 |
|---|---|---|---|---|---|---|---|---|---|
| Layer construction and formulations | Outer layer (Y) | Type Thickness |  | μm | D1 20 | D1 20 | D1 20 | D1 20 | D1 20 |
|  | Inner layer (X) | Component (A) | Type Ratio wt % | | A-8 75 | A-9 75 | A-10 75 | A-11 75 | A-12 75 |
|  |  | Component (B) | Type Ratio wt % | | B-1 20 | B-1 20 | B-1 20 | B-1 20 | B-1 20 |
|  |  | Component (C) | Type Ratio wt % | | C-1 5 | C-1 5 | C-1 5 | C-1 5 | C-1 5 |
|  |  | Thickness |  | μm | 160 | 160 | 160 | 160 | 160 |
|  | Innermost layer (Z) | Type Thickness |  | μm | Z-1 20 | Z-1 20 | Z-1 20 | Z-1 20 | Z-1 20 |
| Film properties |  | Total thickness Appearance Internal haze Tensile modulus Impact strength Cumulative dropped body test (fabricability) |  | μm % MPa KJ/m cm | 200 good 12.3 492 9 150 | 200 good 9.6 510 4 150 | 200 good 21 458 10.8 150 | 200 good product was not obtained due to rough appearance | 200 sample was not obtained due to poor sheet-forming stability |

Examples 12 to 14

Comparative Examples 6 to 9

Aside from using the ingredients mentioned in Table 8, laminated sheets were obtained in the same way as in Example 1.

Evaluation results are shown in Table 8 below.

TABLE 8

|  |  |  | Units | Examples 12 | 13 | 14 | Comparative Examples 6 | 7 | 8 | 9 |
|---|---|---|---|---|---|---|---|---|---|---|
| Layer construction and | Outer layer (Y) | Type Thickness | μm | D1 20 | D1 20 | D1 20 | D1 20 | D1 20 | D1 20 | D1 20 |

TABLE 8-continued

|  |  |  |  | Units | Examples |  |  | Comparative Examples |  |  |  |
|---|---|---|---|---|---|---|---|---|---|---|---|
|  |  |  |  |  | 12 | 13 | 14 | 6 | 7 | 8 | 9 |
| formulations | Inner layer (X) | Component (A) | Type |  | A-3 | A-3 | A-3 | A-3 | A-3 | A-3 | A-3 |
|  |  |  | Ratio | wt % | 80 | 65 | 75 | 75 | 95 | 90 | 45 |
|  |  | Component (B) | Type |  | B-1 | B-1 | B-2 | B-3 | none | B-1 | B-1 |
|  |  |  | Ratio | wt % | 15 | 30 | 20 | 20 |  | 5 | 50 |
|  |  | Component (C) | Type |  | C-1 | C-1 | C-1 | C-1 | C-1 | C-1 | C-1 |
|  |  |  | Ratio | wt % | 5 | 5 | 5 | 5 | 5 | 5 | 5 |
|  |  | Thickness |  | μm | 160 | 160 | 160 | 160 | 160 | 160 | 160 |
|  | Innermost layer (Z) | Type |  |  | Z-1 | Z-1 | Z-1 | Z-1 | Z-1 | Z-1 | Z-1 |
|  |  | Thickness |  | μm | 20 | 20 | 20 | 20 | 20 | 20 | 20 |
|  | Total thickness |  |  | μm | 200 | 200 | 200 | 200 | 200 | 200 | 200 |
| Film properties | Appearance |  |  |  | good | good | good | good | good | good | NG |
|  | Internal haze |  |  | % | 9 | 9 | 12 | 20 | 18 | 14 | good product not obtained due to deformation during heat treatment |
|  | Tensile modulus |  |  | MPa | 355 | 321 | 314 | 383 | 405 | 392 |  |
|  | Impact strength |  |  | KJ/m | 6.8 | 10.9 | 11.2 | 1.9 | 1.5 | 2.2 |  |
|  | Cumulative dropped body test (fabricability) |  |  | cm | 150 | 150 | 150 | 100 | 50 | 100 |  |

In each of the foregoing examples of the invention, the laminated sheet had an excellent transparency, flexibility, heat resistance, impact resistance, appearance and fabricability.

By contrast, in Comparative Example 6, the density of the ethylene-α-olefin copolymer (B) was too high, as a result of which the impact resistance was poor. In Comparative Example 7, no component (B) was added, as a result of which the impact resistance was inadequate. In Comparative Example 8, the component (B) content was too low, as a result of which the impact resistance was inadequate. In Comparative Example 9, the content of component (B) was too high, as a result of which deformation arose during heat treatment (sterilization).

Examples 15 to 18

Comparative Examples 10 to 13

Aside from using the ingredients mentioned in Table 9 below, laminated sheets were obtained in the same way as in Example 1.

Evaluation results are shown in Table 9 below.

In each of the foregoing examples of the invention, the laminated sheet had an excellent transparency, flexibility, heat resistance, impact resistance, appearance and fabricability.

By contrast, in Comparative Example 10, the melting peak temperature of propylene resin (C) (Tm (C)) was too low, making it difficult to suppress thinning. In Comparative Example 11, the MFR of component (C) was too high, as a result of which sheet formation was unstable. In Comparative Example 12, the content of component (C) was too high, as a result of which the flexibility and transparency were poor. In Comparative Example 13, component (C) was not included, making it difficult to suppress thinning.

Examples 19 to 23

Comparative Examples 14 and 15

Aside from using the ingredients mentioned in Table 10 below, laminated sheets were obtained in the same way as in Example 1.

TABLE 9

|  |  |  |  | Units | Examples |  |  |  | Comparative Examples |  |  |  |
|---|---|---|---|---|---|---|---|---|---|---|---|---|
|  |  |  |  |  | 15 | 16 | 17 | 18 | 10 | 11 | 12 | 13 |
| Layer construction and formulations | Outer layer (Y) | Type |  |  | D1 | D1 | D1 | D1 | D1 | D1 | D1 | D1 |
|  |  | Thickness |  | μm | 20 | 20 | 20 | 20 | 20 | 20 | 20 | 20 |
|  | Inner layer (X) | Component (A) | Type |  | A-3 | A-3 | A-3 | A-3 | A-3 | A-3 | A-3 | A-3 |
|  |  |  | Ratio | wt % | 70 | 65 | 75 | 75 | 75 | 60 | 55 | 80 |
|  |  | Component (B) | Type |  | B-1 | B-1 | B-1 | B-1 | B-1 | B-1 | B-1 | B-1 |
|  |  |  | Ratio | wt % | 20 | 20 | 20 | 20 | 20 | 20 | 20 | 20 |
|  |  | Component (C) | Type |  | C-1 | C-1 | C-2 | C-3 | C-4 | C-5 | C-1 | none |
|  |  |  | Ratio | wt % | 10 | 15 | 5 | 5 | 5 | 20 | 25 |  |
|  |  | Thickness |  | μm | 160 | 160 | 160 | 160 | 160 | 160 | 160 | 160 |
|  | Innermost layer (Z) | Type |  |  | Z-1 | Z-1 | Z-1 | Z-1 | Z-1 | Z-1 | Z-1 | Z-1 |
|  |  | Thickness |  | μm | 20 | 20 | 20 | 20 | 20 | 20 | 20 | 20 |
|  | Total thickness |  |  | μm | 200 | 200 | 200 | 200 | 200 | 200 | 200 | 200 |
| Film properties | Appearance |  |  |  | good | good | good | good | good | good sample not obtained due to poor sheet-forming stability | good | good |
|  | Internal haze |  |  | % | 9.9 | 12.3 | 9.3 | 8.9 | 10.3 |  | 15.2 | 11 |
|  | Tensile modulus |  |  | MPa | 355 | 382 | 352 | 346 | 339 |  | 425 | 340 |
|  | Impact strength |  |  | KJ/m | 9.8 | 8.6 | 10.1 | 10 | 10.1 |  | 8 | 10.1 |
|  | Cumulative dropped body test (fabricability) |  |  | cm | 150 | 150 | 150 | 150 | 50 |  | 150 | 50 |

Evaluation results are shown in Table 10 below.

TABLE 10

|  |  |  |  | Examples | | | | | Comp. Ex. | |
|---|---|---|---|---|---|---|---|---|---|---|
|  |  |  | Units | 19 | 20 | 21 | 22 | 23 | 14 | 15 |
| Layer construction and formulations | Outer layer (Y) | Type |  | D2 | D3 | D4 | D5 | A-8: 85% B-1: 15% | D6 | same as inner layer |
|  |  | Thickness | μm | 20 | 20 | 20 | 20 | 20 | 20 | 20 |
|  | Inner layer (X) | Component (A) Type |  | A-3 | A-3 | A-3 | A-3 | A-3 | A-3 | A-3 |
|  |  | Ratio | wt % | 75 | 75 | 75 | 75 | 75 | 75 | 75 |
|  |  | Component (B) Type |  | B-1 | B-1 | B-1 | B-1 | B-1 | B-1 | B-1 |
|  |  | Ratio | wt % | 20 | 20 | 20 | 20 | 20 | 20 | 20 |
|  |  | Component (C) Type |  | C-1 | C-1 | C-1 | C-1 | C-1 | C-1 | C-1 |
|  |  | Ratio | wt % | 5 | 5 | 5 | 5 | 5 | 5 | 5 |
|  |  | Thickness | μm | 160 | 160 | 160 | 160 | 160 | 160 | 160 |
|  | Innermost layer (Z) | Type |  | Z-1 | Z-1 | Z-1 | Z-1 | Z-1 | Z-1 | Z-1 |
|  |  | Thickness | μm | 20 | 20 | 20 | 20 | 20 | 20 | 20 |
| Film properties | Total thickness |  | μm | 200 | 200 | 200 | 200 | 200 | 200 | 200 |
|  | Appearance |  |  | good | good | good | good | good | good | good |
|  | Internal haze |  | % | 10.2 | 9.6 | 9.5 | 9 | 7.1 | 6.5 | 8.5 |
|  | Tensile modulus |  | MPa | 361 | 335 | 344 | 330 | 279 | 314 | 254 |
|  | Impact strength |  | KJ/m | 9.8 | 10.1 | 10.1 | 10.1 | 10.9 | 10.5 | 11 |
|  | Cumulative dropped body test (fabricability) |  | cm | 150 | 150 | 150 | 150 | 150 | stuck to heat-sealing bar | |

In each of the foregoing examples of the invention, the laminated sheet had an excellent transparency, flexibility, heat resistance, impact resistance, appearance and fabricability.

By contrast, in Comparative Example 14, the propylene resin composition (Y) for the outer layer had too low a melting peak temperature Tm(D) and thus adhered to the heat-sealing bar, resulting in a poor fabricability. In Comparative Example 15, because the same resin composition as that in the inner layer was used as the component (D) (melting peak temperature, 142° C.) and thus adhered to the heat-sealing bar due to extremely low a melting peak temperature Tm(D), the fabricability was poor.

Industrial Applicability

The multilayer propylene resin sheets of the invention have an excellent flexibility, transparency, heat resistance, low-temperature impact resistance and low-temperature heat sealability, possess a fabricability that minimizes the occurrence of appearance defects such as interfacial roughness and thickness fluctuations during multilayer formation and, because they do not readily give rise to molten resin flow and thinning even under harsh heat-sealing conditions, exhibit an excellent bag-breaking strength. Heat-treatable packaging bags obtained using such a sheet are highly useful for IV infusion bag and pascalization packaging bag applications.

The invention claimed is:

1. A multilayer propylene resin sheet, comprising:
an inner layer comprising a first propylene resin composition, and
an outer layer comprising a second propylene resin composition that comprises a propylene resin having a melting peak temperature of from 150 to 170° C.,
wherein the first propylene resin composition comprises from 40 to 89 wt % of a propylene resin composition A, from 10 to 40 wt % of an ethylene-α-olefin copolymer B, and from 1 to 20 wt % of a propylene resin C,
the polypropylene resin composition A comprises from 30 to 70 wt % of a first propylene-α-olefin random copolymer component having a melting peak temperature of from 120 to 150° C., and from 70 to 30 wt % of a second propylene-α-olefin random copolymer component having a total content of at least one of a $C_2$ α-olefin and a $C_{4-8}$ α-olefin of more than 17 wt % and up to 25 wt %,
the polypropylene resin composition A has a melt flow rate at 230° C. and 2.16 kg of from 0.5 to 20 g/10 min,
the ethylene-α-olefin copolymer B has a density of from 0.860 to 0.910 g/cm³ and a melt flow rate at 190° C. and 2.16 kg of from 0.1 to 20 g/10 min, and
the propylene resin C has a melting peak temperature of more than 150° C. and up to 170° C. and a melt flow rate at 230° C. and 2.16 kg of from 0.5 to 30 g/10 min
wherein the first and second propylene-α-olefin random copolymer components are obtained by a successive polymerization comprising, in order:
polymerizing from 30 to 70 wt % of the first propylene-α-olefin random copolymer component, and
polymerizing from 70 to 30 wt % of the second propylene-α-olefin random copolymer component.

2. The multilayer propylene resin sheet according to claim 1, wherein the propylene resin composition A is obtained in the presence of a Ziegler-Natta catalyst.

3. The multilayer polypropylene resin sheet according to of claim 1, further comprising an innermost layer,
wherein the inner layer is between the outer layer and the innermost layer.

4. The multilayer polypropylene resin sheet according to claim 1, wherein the second propylene-α-olefin random copolymer is a propylene-ethylene random copolymer.

5. The multilayer polypropylene resin sheet according to claim 1, wherein the first propylene-α-olefin random copolymer is a propylene-ethylene random copolymer.

6. A heat-treatable packaging material, comprising the multilayer propylene resin sheet of claim 1.

7. An intravenous injection (IV) infusion bag, comprising the heat-treatable packaging material of claim 6.

8. The multilayer propylene resin sheet of claim 1, wherein the melting peak temperature of the first propylene-α-olefin random copolymer component is from 130 to 145° C.

9. The multilayer polypropylene resin sheet of claim 1, wherein a content of the first propylene-α-olefin random copolymer component in the polypropylene resin composition A is from 35 to 65 wt %.

10. The multilayer polypropylene resin sheet according to claim 1, wherein a content of the propylene resin composition A in the first propylene resin composition is from 50 to 80 wt %.

11. The multilayer polypropylene resin sheet according to claim 1, wherein the ethylene-α-olefin copolymer B is obtained by a process comprising copolymerizing ethylene with an α-olefin having from 3 to 20 carbon atoms.

12. The multilayer polypropylene resin sheet according to claim 1, wherein the propylene resin C has a melt flow rate at 230° C. and 2.16 kg of from 0.5 to 15 g/10 min.

* * * * *